(12) United States Patent
Ishikawa et al.

(10) Patent No.: US 9,253,029 B2
(45) Date of Patent: Feb. 2, 2016

(54) COMMUNICATION MONITOR, OCCURRENCE PREDICTION METHOD, AND RECORDING MEDIUM

(71) Applicant: FUJITSU LIMITED, Kawasaki-shi, Kanagawa (JP)

(72) Inventors: Yuuichi Ishikawa, Yokohama (JP); Junichi Yoshio, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 14/075,489

(22) Filed: Nov. 8, 2013

(65) Prior Publication Data

US 2014/0198660 A1 Jul. 17, 2014

(30) Foreign Application Priority Data

Jan. 16, 2013 (JP) .................................. 2013-005771

(51) Int. Cl.
| | |
|---|---|
| *H04L 1/00* | (2006.01) |
| *H04L 12/24* | (2006.01) |
| *H04L 12/721* | (2013.01) |
| *H04L 12/26* | (2006.01) |
| *H04L 12/751* | (2013.01) |
| *H04L 12/703* | (2013.01) |
| *H04L 12/725* | (2013.01) |

(52) U.S. Cl.
CPC ............ *H04L 41/069* (2013.01); *H04L 41/142* (2013.01); *H04L 45/70* (2013.01); *H04L 43/0829* (2013.01); *H04L 43/0852* (2013.01); *H04L 43/16* (2013.01); *H04L 45/02* (2013.01); *H04L 45/28* (2013.01); *H04L 45/302* (2013.01)

(58) Field of Classification Search
None
See application file for complete search history.

(56) References Cited

U.S. PATENT DOCUMENTS

| | | | |
|---|---|---|---|
| 5,757,774 | A | 5/1998 | Oka |
| 7,701,843 | B1 | 4/2010 | Licari et al. |
| 8,015,278 | B1 | 9/2011 | Papa et al. |
| 2005/0013245 | A1 | 1/2005 | Sreemanthula et al. |
| 2007/0204159 | A1 | 8/2007 | Hara |

(Continued)

FOREIGN PATENT DOCUMENTS

| | | |
|---|---|---|
| JP | 2005-285040 | 10/2005 |
| JP | 2009-10438 | 1/2009 |

OTHER PUBLICATIONS

U.S. Appl. No. 14/085,075, filed Nov. 20, 2013, Yuuichi Ishikawa, Fujitsu Limited.

(Continued)

*Primary Examiner* — Kibrom T Hailu
(74) *Attorney, Agent, or Firm* — Staas & Halsey LLP

(57) ABSTRACT

A communication monitor includes a path change determining unit that generates path change information including a path change at the time of the path change in a network and an alarm at the time of the path change, and a collecting unit that collects traffic information of each path in the network. The communication monitor further includes an evaluating unit that calculates a degree of coincidence of traffic information representing a degree by which traffic information at the time of the current path change coincides with previous traffic information in the path change information immediately before the path change. The communication monitor further includes a predicting unit that predicts an alarm of the path change information related to the previous traffic information as an alarm at the time of the current path change when the degree of coincidence of the traffic information exceeds an alarm threshold value.

7 Claims, 26 Drawing Sheets

(56) References Cited

U.S. PATENT DOCUMENTS

| | | |
|---|---|---|
| 2008/0080384 A1 | 4/2008 | Atkins et al. |
| 2008/0133517 A1 | 6/2008 | Kapoor et al. |
| 2010/0128596 A1 | 5/2010 | Saitoh |
| 2010/0205289 A1 | 8/2010 | Miyazaki |
| 2011/0205898 A1* | 8/2011 | Ichiki et al. .................. 370/235 |
| 2013/0138650 A1 | 5/2013 | Fujii et al. |
| 2013/0329571 A1 | 12/2013 | Shimokawa et al. |
| 2014/0198654 A1 | 7/2014 | Ishikawa et al. |
| 2014/0198660 A1 | 7/2014 | Ishikawa et al. |

OTHER PUBLICATIONS

Office Action issued Jul. 15, 2015 in U.S. Appl. No. 14/085,075.
Office Action issued Aug. 10, 2015 in U.S. Appl. No. 14/085,075.
Office Action issued Apr. 23, 2015 in U.S. Appl. No. 14/085,075.

* cited by examiner

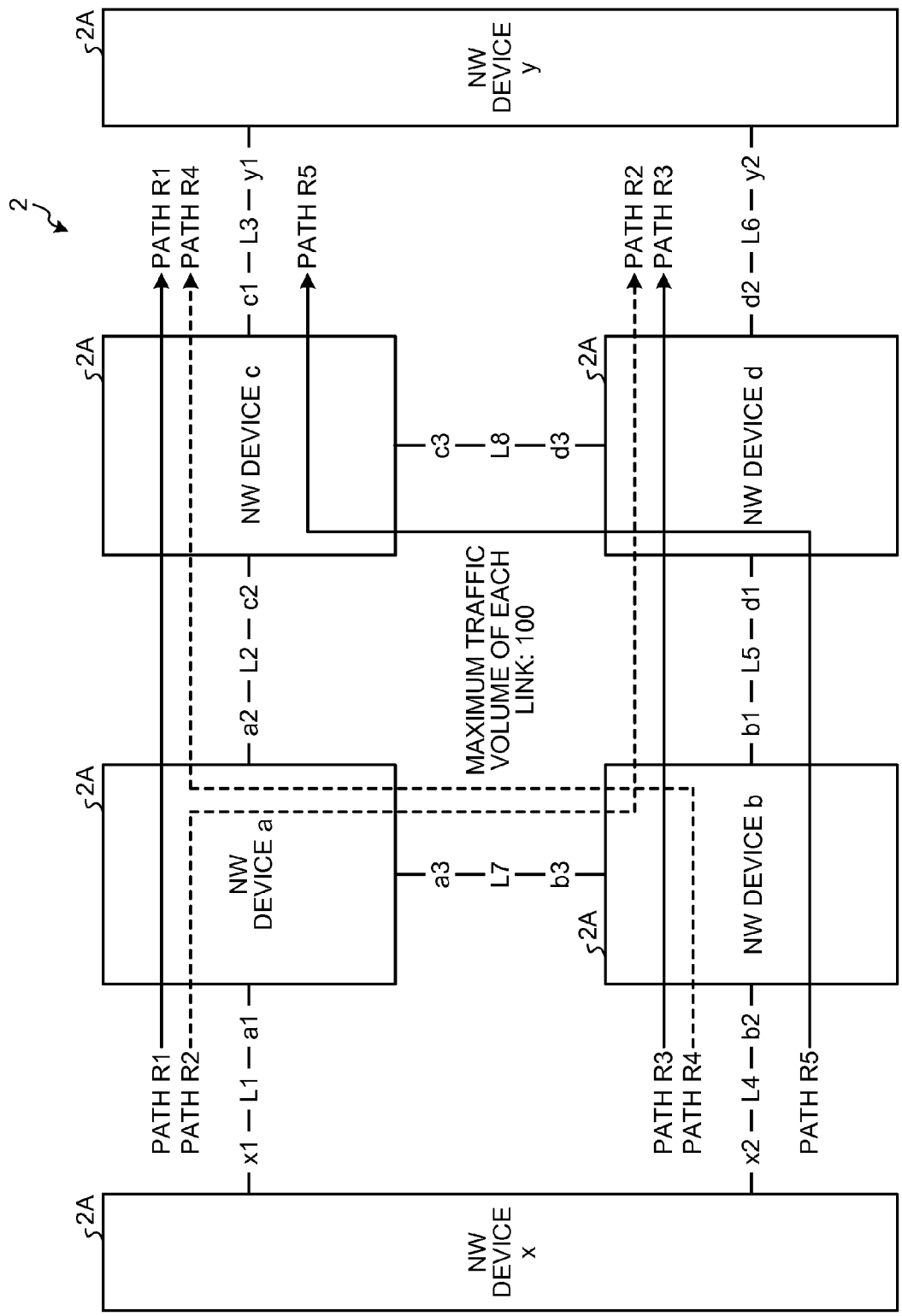

FIG.5

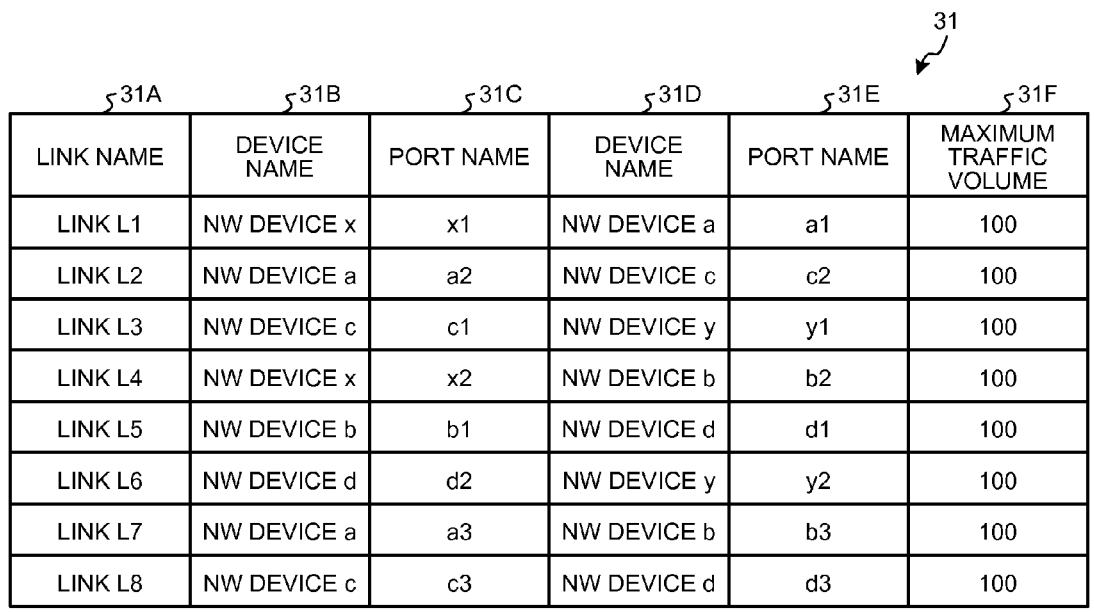

| LINK NAME | DEVICE NAME | PORT NAME | DEVICE NAME | PORT NAME | MAXIMUM TRAFFIC VOLUME |
|---|---|---|---|---|---|
| LINK L1 | NW DEVICE x | x1 | NW DEVICE a | a1 | 100 |
| LINK L2 | NW DEVICE a | a2 | NW DEVICE c | c2 | 100 |
| LINK L3 | NW DEVICE c | c1 | NW DEVICE y | y1 | 100 |
| LINK L4 | NW DEVICE x | x2 | NW DEVICE b | b2 | 100 |
| LINK L5 | NW DEVICE b | b1 | NW DEVICE d | d1 | 100 |
| LINK L6 | NW DEVICE d | d2 | NW DEVICE y | y2 | 100 |
| LINK L7 | NW DEVICE a | a3 | NW DEVICE b | b3 | 100 |
| LINK L8 | NW DEVICE c | c3 | NW DEVICE d | d3 | 100 |

FIG.6

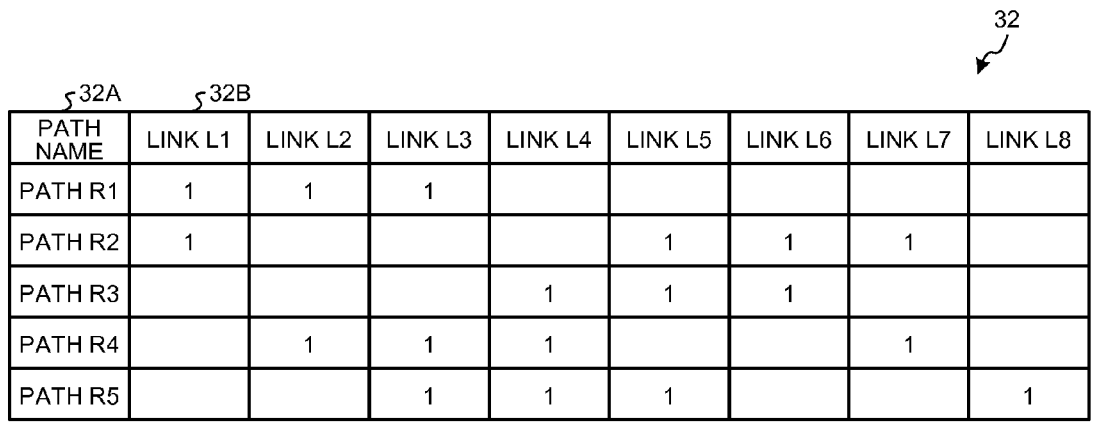

| PATH NAME | LINK L1 | LINK L2 | LINK L3 | LINK L4 | LINK L5 | LINK L6 | LINK L7 | LINK L8 |
|---|---|---|---|---|---|---|---|---|
| PATH R1 | 1 | 1 | 1 | | | | | |
| PATH R2 | 1 | | | | 1 | 1 | 1 | |
| PATH R3 | | | | 1 | 1 | 1 | | |
| PATH R4 | | 1 | 1 | 1 | | | 1 | |
| PATH R5 | | | 1 | 1 | 1 | | | 1 |

| USER NAME | TRANSMISSION SOURCE IP ADDRESS | TRANSMISSION DESTINATION IP ADDRESS | IN-USE PATH |
|---|---|---|---|
| USER A | 1.0.0.1/24 | 11.0.0.11/24 | PATH R1 |
| USER B | 3.0.0.3/24 | 33.0.0.33/24 | PATH R3 |
| USER C | 5.0.0.5/24 | 55.0.0.55/24 | PATH R5 |

| OCCURRENCE DATE | OCCURRENCE TIME | PRE-CHANGE PATH | POST-CHANGE PATH | ALARM CAUSING DEVICE | ALARM NAME |
|---|---|---|---|---|---|
| 6/1 | 9:01 | PATH R1 | PATH R2 | NW DEVICE a | ALARM 1 |
| 6/13 | 13:13 | PATH R3 | PATH R4 | NW DEVICE b | ALARM 2 |
| 6/22 | 2:22 | PATH R5 | PATH R3 | NW DEVICE c | ALARM 3 |

FIG.9

| PATH NAME | MONTH AND DATE | TIME | TRAFFIC VOLUME ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 8/15 | 12:38 | 86 | 86 | 86 | | | | | |
| PATH R3 | 8/15 | 12:38 | | | | 40 | 40 | 40 | | |
| PATH R5 | 8/15 | 12:38 | | | 30 | 30 | 30 | | | 30 |

| PATH NAME | MONTH AND DATE | TIME | PACKET LOSS AMOUNT ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 8/15 | 12:38 | 18 | 18 | 18 | | | | | |
| PATH R3 | 8/15 | 12:38 | | | | 0 | 0 | 0 | | |
| PATH R5 | 8/15 | 12:38 | | | 0 | 0 | 0 | | | 0 |

| PATH NAME (37A) | MONTH AND DATE (37B) | TIME (37C) | DELAY AMOUNT (37D) ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 8/15 | 12:38 | 15 | 15 | 15 | | | | | |
| PATH R3 | 8/15 | 12:38 | | | | 0 | 0 | 0 | | |
| PATH R5 | 8/15 | 12:38 | | | 0 | 0 | 0 | | | 0 |

FIG.12

| DATA TYPE (38A) | COINCIDENCE RANGE (38B) |
|---|---|
| TRAFFIC VOLUME | WITHIN ±10% |
| PACKET LOSS AMOUNT | WITHIN ±30% |
| DELAY AMOUNT | WITHIN ±30% |

| PATH NAME | MONTH AND DATE | TIME | TRAFFIC VOLUME ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 6/1 | 8:56 | 60 | 60 | 60 | | | | | |
| PATH R3 | 6/1 | 8:56 | | | | 40 | 40 | 40 | | |
| PATH R5 | 6/1 | 8:56 | | | 30 | 30 | 30 | | | 30 |
| PATH R1 | 6/1 | 8:57 | 70 | 70 | 70 | | | | | |
| PATH R3 | 6/1 | 8:57 | | | | 40 | 40 | 40 | | |
| PATH R5 | 6/1 | 8:57 | | | 30 | 30 | 30 | | | 30 |
| PATH R1 | 6/1 | 8:58 | 80 | 80 | 80 | | | | | |
| PATH R3 | 6/1 | 8:58 | | | | 40 | 40 | 40 | | |
| PATH R5 | 6/1 | 8:58 | | | 30 | 30 | 30 | | | 30 |
| PATH R1 | 6/1 | 8:59 | 72 | 72 | 72 | | | | | |
| PATH R3 | 6/1 | 8:59 | | | | 40 | 40 | 40 | | |
| PATH R5 | 6/1 | 8:59 | | | 30 | 30 | 30 | | | 30 |
| PATH R1 | 6/1 | 9:00 | 85 | 85 | 85 | | | | | |
| PATH R3 | 6/1 | 9:00 | | | | 40 | 40 | 40 | | |
| PATH R5 | 6/1 | 9:00 | | | 30 | 30 | 30 | | | 30 |
| ⋮ | ⋮ | ⋮ | ⋮ | ⋮ | ⋮ | | | | ⋮ | ⋮ |
| PATH R1 | 8/15 | 12:34 | 58 | 58 | 58 | | | | | |
| PATH R3 | 8/15 | 12:34 | | | | 40 | 40 | 40 | | |
| PATH R5 | 8/15 | 12:34 | | | 30 | 30 | 30 | | | 30 |
| PATH R1 | 8/15 | 12:35 | 75 | 75 | 75 | | | | | |
| PATH R3 | 8/15 | 12:35 | | | | 40 | 40 | 40 | | |
| PATH R5 | 8/15 | 12:35 | | | 30 | 30 | 30 | | | 30 |
| PATH R1 | 8/15 | 12:36 | 71 | 71 | 71 | | | | | |
| PATH R3 | 8/15 | 12:36 | | | | 40 | 40 | 40 | | |
| PATH R5 | 8/15 | 12:36 | | | 30 | 30 | 30 | | | 30 |
| PATH R1 | 8/15 | 12:37 | 76 | 76 | 76 | | | | | |
| PATH R3 | 8/15 | 12:37 | | | | 40 | 40 | 40 | | |
| PATH R5 | 8/15 | 12:37 | | | 30 | 30 | 30 | | | 30 |
| PATH R1 | 8/15 | 12:38 | 86 | 86 | 86 | | | | | |
| PATH R3 | 8/15 | 12:38 | | | | 40 | 40 | 40 | | |
| PATH R5 | 8/15 | 12:38 | | | 30 | 30 | 30 | | | 30 |

FIG.20B

| PATH NAME | MONTH AND DATE | TIME | PACKET LOSS AMOUNT ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 6/1 | 8:56 | 0 | 0 | 0 | | | | | |
| PATH R3 | 6/1 | 8:56 | | | | 0 | 0 | 0 | | |
| PATH R5 | 6/1 | 8:56 | | | 0 | 0 | 0 | | | 0 |
| PATH R1 | 6/1 | 8:57 | 0 | 0 | 0 | | | | | |
| PATH R3 | 6/1 | 8:57 | | | | 0 | 0 | 0 | | |
| PATH R5 | 6/1 | 8:57 | | | 0 | 0 | 0 | | | 0 |
| PATH R1 | 6/1 | 8:58 | 5 | 5 | 5 | | | | | |
| PATH R3 | 6/1 | 8:58 | | | | 0 | 0 | 0 | | |
| PATH R5 | 6/1 | 8:58 | | | 0 | 0 | 0 | | | 0 |
| PATH R1 | 6/1 | 8:59 | 0 | 0 | 0 | | | | | |
| PATH R3 | 6/1 | 8:59 | | | | 0 | 0 | 0 | | |
| PATH R5 | 6/1 | 8:59 | | | 0 | 0 | 0 | | | 0 |
| PATH R1 | 6/1 | 9:00 | 15 | 15 | 15 | | | | | |
| PATH R3 | 6/1 | 9:00 | | | | 0 | 0 | 0 | | |
| PATH R5 | 6/1 | 9:00 | | | 0 | 0 | 0 | | | 0 |
| ⋮ | ⋮ | ⋮ | ⋮ | ⋮ | ⋮ | ⋮ | ⋮ | ⋮ | ⋮ | ⋮ |
| PATH R1 | 8/15 | 12:34 | 0 | 0 | 0 | | | | | |
| PATH R3 | 8/15 | 12:34 | | | | 0 | 0 | 0 | | |
| PATH R5 | 8/15 | 12:34 | | | 0 | 0 | 0 | | | 0 |
| PATH R1 | 8/15 | 12:35 | 2 | 2 | 2 | | | | | |
| PATH R3 | 8/15 | 12:35 | | | | 0 | 0 | 0 | | |
| PATH R5 | 8/15 | 12:35 | | | 0 | 0 | 0 | | | 0 |
| PATH R1 | 8/15 | 12:36 | 3 | 4 | 4 | | | | | |
| PATH R3 | 8/15 | 12:36 | | | | 0 | 0 | 0 | | |
| PATH R5 | 8/15 | 12:36 | | | 0 | 0 | 0 | | | 0 |
| PATH R1 | 8/15 | 12:37 | 0 | 0 | 0 | | | | | |
| PATH R3 | 8/15 | 12:37 | | | | 0 | 0 | 0 | | |
| PATH R5 | 8/15 | 12:37 | | | 0 | 0 | 0 | | | 0 |
| PATH R1 | 8/15 | 12:38 | 18 | 18 | 18 | | | | | |
| PATH R3 | 8/15 | 12:38 | | | | 0 | 0 | 0 | | |
| PATH R5 | 8/15 | 12:38 | | | 0 | 0 | 0 | | | 0 |

FIG.20C

| PATH NAME | MONTH AND DATE | TIME | DELAY AMOUNT ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 6/1 | 8:56 | 0 | 0 | 0 | | | | | |
| PATH R3 | 6/1 | 8:56 | | | | 0 | 0 | 0 | | |
| PATH R5 | 6/1 | 8:56 | | | 0 | 0 | 0 | | | 0 |
| PATH R1 | 6/1 | 8:57 | 0 | 0 | 0 | | | | | |
| PATH R3 | 6/1 | 8:57 | | | | 0 | 0 | 0 | | |
| PATH R5 | 6/1 | 8:57 | | | 0 | 0 | 0 | | | 0 |
| PATH R1 | 6/1 | 8:58 | 5 | 5 | 5 | | | | | |
| PATH R3 | 6/1 | 8:58 | | | | 0 | 0 | 0 | | |
| PATH R5 | 6/1 | 8:58 | | | 0 | 0 | 0 | | | 0 |
| PATH R1 | 6/1 | 8:59 | 0 | 0 | 0 | | | | | |
| PATH R3 | 6/1 | 8:59 | | | | 0 | 0 | 0 | | |
| PATH R5 | 6/1 | 8:59 | | | 0 | 0 | 0 | | | 0 |
| PATH R1 | 6/1 | 9:00 | 15 | 15 | 15 | | | | | |
| PATH R3 | 6/1 | 9:00 | | | | 0 | 0 | 0 | | |
| PATH R5 | 6/1 | 9:00 | | | 0 | 0 | 0 | | | 0 |
| ⋮ | ⋮ | ⋮ | ⋮ | ⋮ | ⋮ | ⋮ | ⋮ | ⋮ | ⋮ | ⋮ |
| PATH R1 | 8/15 | 12:34 | 1 | 1 | 1 | | | | | |
| PATH R3 | 8/15 | 12:34 | | | | 0 | 0 | 0 | | |
| PATH R5 | 8/15 | 12:34 | | | 0 | 0 | 0 | | | 0 |
| PATH R1 | 8/15 | 12:35 | 0 | 0 | 0 | | | | | |
| PATH R3 | 8/15 | 12:35 | | | | 0 | 0 | 0 | | |
| PATH R5 | 8/15 | 12:35 | | | 0 | 0 | 0 | | | 0 |
| PATH R1 | 8/15 | 12:36 | 3 | 4 | 4 | | | | | |
| PATH R3 | 8/15 | 12:36 | | | | 0 | 0 | 0 | | |
| PATH R5 | 8/15 | 12:36 | | | 0 | 0 | 0 | | | 0 |
| PATH R1 | 8/15 | 12:37 | 2 | 2 | 2 | | | | | |
| PATH R3 | 8/15 | 12:37 | | | | 0 | 0 | 0 | | |
| PATH R5 | 8/15 | 12:37 | | | 0 | 0 | 0 | | | 0 |
| PATH R1 | 8/15 | 12:38 | 15 | 15 | 15 | | | | | |
| PATH R3 | 8/15 | 12:38 | | | | 0 | 0 | 0 | | |
| PATH R5 | 8/15 | 12:38 | | | 0 | 0 | 0 | | | 0 |

| PATH NAME | MONTH AND DATE | TIME | TRAFFIC VOLUME ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 6/1 | 8:56 | 60 | 60 | 60 | | | | | |
| PATH R1 | 6/1 | 8:57 | 70 | 70 | 70 | | | | | |
| PATH R1 | 6/1 | 8:58 | 80 | 80 | 80 | | | | | |
| PATH R1 | 6/1 | 8:59 | 72 | 72 | 72 | | | | | |
| PATH R1 | 6/1 | 9:00 | 85 | 85 | 85 | | | | | |

35A 35B 35C 35D — 35

(B)

| PATH NAME | MONTH AND DATE | TIME | PACKET LOSS AMOUNT ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 6/1 | 8:56 | 0 | 0 | 0 | | | | | |
| PATH R1 | 6/1 | 8:57 | 0 | 0 | 0 | | | | | |
| PATH R1 | 6/1 | 8:58 | 5 | 5 | 5 | | | | | |
| PATH R1 | 6/1 | 8:59 | 0 | 0 | 0 | | | | | |
| PATH R1 | 6/1 | 9:00 | 15 | 15 | 15 | | | | | |

36A 36B 36C 36D — 36

(C)

| PATH NAME | MONTH AND DATE | TIME | DELAY AMOUNT ||||||||
|---|---|---|---|---|---|---|---|---|---|---|
| | | | LINK L1 | LINK L2 | LINK L3 | LINK L4 | LINK L5 | LINK L6 | LINK L7 | LINK L8 |
| PATH R1 | 6/1 | 8:56 | 0 | 0 | 0 | | | | | |
| PATH R1 | 6/1 | 8:57 | 0 | 0 | 0 | | | | | |
| PATH R1 | 6/1 | 8:58 | 5 | 5 | 5 | | | | | |
| PATH R1 | 6/1 | 8:59 | 0 | 0 | 0 | | | | | |
| PATH R1 | 6/1 | 9:00 | 15 | 15 | 15 | | | | | |

37A 37B 37C 37D — 37

(D)

| PATH NAME | MONTH AND DATE | TIME | TRAFFIC VOLUME ||| PACKET LOSS AMOUNT ||| DELAY AMOUNT |||
|---|---|---|---|---|---|---|---|---|---|---|---|
| | | | LINK L1 | LINK L2 | LINK L3 | LINK L1 | LINK L2 | LINK L3 | LINK L1 | LINK L2 | LINK L3 |
| PATH R1 | 6/1 | 8:56 | 60 | 60 | 60 | 0 | 0 | 0 | 0 | 0 | 0 |
| PATH R1 | 6/1 | 8:57 | 70 | 70 | 70 | 0 | 0 | 0 | 0 | 0 | 0 |
| PATH R1 | 6/1 | 8:58 | 80 | 80 | 80 | 5 | 5 | 5 | 5 | 5 | 5 |
| PATH R1 | 6/1 | 8:59 | 72 | 72 | 72 | 0 | 0 | 0 | 0 | 0 | 0 |
| PATH R1 | 6/1 | 9:00 | 85 | 85 | 85 | 15 | 15 | 15 | 15 | 15 | 15 |

42A 42B 42C 42D 42E 42F — 42

(E)

| PATH NAME | MONTH AND DATE | TIME | TRAFFIC VOLUME ||| PACKET LOSS AMOUNT ||| DELAY AMOUNT |||
|---|---|---|---|---|---|---|---|---|---|---|---|
| | | | LINK L1 | LINK L2 | LINK L3 | LINK L1 | LINK L2 | LINK L3 | LINK L1 | LINK L2 | LINK L3 |
| PATH R1 | 8/15 | 12:34 | 58 | 58 | 58 | 0 | 0 | 0 | 1 | 1 | 1 |
| PATH R1 | 8/15 | 12:35 | 7 | 75 | 75 | 2 | 2 | 2 | 0 | 0 | 0 |
| PATH R1 | 8/15 | 12:36 | 71 | 71 | 72 | 3 | 4 | 4 | 3 | 4 | 4 |
| PATH R1 | 8/15 | 12:37 | 76 | 76 | 76 | 0 | 0 | 0 | 2 | 2 | 2 |
| PATH R1 | 8/15 | 12:38 | 86 | 86 | 86 | 18 | 18 | 18 | 15 | 15 | 15 |

| | | | TRAFFIC VOLUME | | | PACKET LOSS AMOUNT | | | DELAY AMOUNT | | |
|---|---|---|---|---|---|---|---|---|---|---|---|
| PATH NAME (42A) | MONTH AND DATE (42B) | TIME (42C) | LINK L1 | LINK L2 | LINK L3 | LINK L1 | LINK L2 | LINK L3 | LINK L1 | LINK L2 | LINK L3 |
| | | | (42D) | | | (42E) | | | (42F) | | |
| PATH R1 | 6/1 | 8:56 | 60 | 60 | 60 | 0 | 0 | 0 | 0 | 0 | 0 |
| PATH R1 | 6/1 | 8:57 | 70 | 70 | 70 | 0 | 0 | 0 | 0 | 0 | 0 |
| PATH R1 | 6/1 | 8:58 | 80 | 80 | 80 | 5 | 5 | 5 | 5 | 5 | 5 |
| PATH R1 | 6/1 | 8:59 | 72 | 72 | 72 | 0 | 0 | 0 | 0 | 0 | 0 |
| PATH R1 | 6/1 | 9:00 | 85 | 85 | 85 | 15 | 15 | 15 | 15 | 15 | 15 |

⇓ CALCULATION (B) 44

| | | | TRAFFIC VOLUME | | | PACKET LOSS AMOUNT | | | DELAY AMOUNT | | |
|---|---|---|---|---|---|---|---|---|---|---|---|
| PATH NAME (44A) | MONTH AND DATE (44B) | TIME (44C) | LINK L1 | LINK L2 | LINK L3 | LINK L1 | LINK L2 | LINK L3 | LINK L1 | LINK L2 | LINK L3 |
| | | | (44D) | | | (44E) | | | (44F) | | |
| PATH R1 | 6/1 | 8:56 | 54 TO 56 | 54 TO 56 | 54 TO 56 | 0 TO 1 | 0 TO 1 | 0 TO 1 | 0 TO 1 | 0 TO 1 | 0 TO 1 |
| PATH R1 | 6/1 | 8:57 | 63 TO 77 | 63 TO 77 | 63 TO 77 | 0 TO 1 | 0 TO 1 | 0 TO 1 | 0 TO 1 | 0 TO 1 | 0 TO 1 |
| PATH R1 | 6/1 | 8:58 | 72 TO 88 | 72 TO 88 | 72 TO 88 | 3.5 TO 6.5 | 3.5 TO 6.5 | 3.5 TO 6.5 | 3.5 TO 6.5 | 3.5 TO 6.5 | 3.5 TO 6.5 |
| PATH R1 | 6/1 | 8:59 | 64.8 TO 79.2 | 64.8 TO 79.2 | 64.8 TO 79.2 | 0 TO 1 | 0 TO 1 | 0 TO 1 | 0 TO 1 | 0 TO 1 | 0 TO 1 |
| PATH R1 | 6/1 | 9:00 | 76.5 TO 93.5 | 76.5 TO 93.5 | 76.5 TO 93.5 | 10.5 TO 19.5 | 10.5 TO 19.5 | 10.5 TO 19.5 | 10.5 TO 19.5 | 10.5 TO 19.5 | 10.5 TO 19.5 |

⇕ COMPARISON (C) 43

| | | | TRAFFIC VOLUME | | | PACKET LOSS AMOUNT | | | DELAY AMOUNT | | |
|---|---|---|---|---|---|---|---|---|---|---|---|
| PATH NAME (43A) | MONTH AND DATE (43B) | TIME (43C) | LINK L1 | LINK L2 | LINK L3 | LINK L1 | LINK L2 | LINK L3 | LINK L1 | LINK L2 | LINK L3 |
| | | | (43D) | | | (43E) | | | (43F) | | |
| PATH R1 | 8/15 | 12:34 | 58 | 58 | 58 | 0 | 0 | 0 | 1 | 1 | 1 |
| PATH R1 | 8/15 | 12:35 | 7 | 75 | 75 | 2 | 2 | 2 | 0 | 0 | 0 |
| PATH R1 | 8/15 | 12:36 | 71 | 71 | 72 | 3 | 4 | 4 | 3 | 4 | 4 |
| PATH R1 | 8/15 | 12:37 | 76 | 76 | 76 | 0 | 0 | 0 | 2 | 2 | 2 |
| PATH R1 | 8/15 | 12:38 | 86 | 86 | 86 | 18 | 18 | 18 | 15 | 15 | 15 |

⇓ COMPARISON RESULT (D) 45

| | | | TRAFFIC VOLUME | | | PACKET LOSS AMOUNT | | | DELAY AMOUNT | | |
|---|---|---|---|---|---|---|---|---|---|---|---|
| PATH NAME (45A) | MONTH AND DATE (45B) | TIME (45C) | LINK L1 | LINK L2 | LINK L3 | LINK L1 | LINK L2 | LINK L3 | LINK L1 | LINK L2 | LINK L3 |
| | | | (45D) | | | (45E) | | | (45F) | | |
| PATH A | 8/15 | 12:34 | 1 | 1 | 1 | 1 | 1 | 1 | 1 | 1 | 1 |
| PATH A | 8/15 | 12:35 | 1 | 1 | 1 | 0 | 0 | 0 | 1 | 1 | 1 |
| PATH A | 8/15 | 12:36 | 0 | 0 | 1 | 0 | 1 | 1 | 0 | 1 | 1 |
| PATH A | 8/15 | 12:37 | 1 | 1 | 1 | 1 | 1 | 1 | 0 | 0 | 0 |
| PATH A | 8/15 | 12:38 | 1 | 1 | 1 | 1 | 1 | 1 | 1 | 1 | 1 |

| TRAFFIC VOLUME (39A) | PACKET LOSS AMOUNT (39B) | DELAY AMOUNT (39C) |
|---|---|---|
| 87% | 73% | 73% |

(39)

↓

(B)

| DATA TYPE (40A) | WEIGHT VALUE (40B) |
|---|---|
| TRAFFIC VOLUME | 5 |
| PACKET LOSS AMOUNT | 3 |
| DELAY AMOUNT | 2 |

(40)

↓

(C)

| DATA TYPE | CALCULATE DEGREE OF COINCIDENCE IN VIEW OF WEIGHT VALUE | AVERAGE DEGREE OF COINCIDENCE (SUM VALUE) |
|---|---|---|
| TRAFFIC VOLUME | AVERAGE DEGREE OF COINCIDENCE 87% × WEIGHT VALUE 5/10=43.5 | 80% |
| PACKET LOSS AMOUNT | AVERAGE DEGREE OF COINCIDENCE 73% × WEIGHT VALUE 3/10=21.9 | |
| DELAY AMOUNT | AVERAGE DEGREE OF COINCIDENCE 73% × WEIGHT VALUE 2/10=14.6 | |

| | | | | | 34 |
|---|---|---|---|---|---|
| 34A | 34B | 34C | 34D | 34E | 34F |
| OCCUR-RENCE DATE | OCCUR-RENCE TIME | PRE-CHANGE PATH | POST-CHANGE PATH | ALARM CAUSING DEVICE | ALARM NAME |
| 6/1 | 9:01 | PATH R1 | PATH R2 | NW DEVICE a | ALARM 1 |

(B)

| | 41 |
|---|---|
| 41A | 41B |
| ALARM CAUSING DEVICE | ALARM NAME |
| NW DEVICE a | ALARM 1 |

FIG.29

| No. | ALARM PREDICTION DATE AND TIME | | FAILURE SPOT | PRE-DICTIVE ALARM NAME | FAILURE RANK | PRE-CHANGE PATH | POST-CHANGE PATH |
|---|---|---|---|---|---|---|---|
| 1 | 2012/8/15 | 12:38:00 | NW DEVICE a | ALARM 1 | FATALLY SEVERE | PATH R1 | PATH R2 |
| 2 | 2012/8/15 | 12:38:00 | NW DEVICE b | ALARM 2 | SEVERE | PATH R3 | PATH R4 |
| 3 | 2012/10/28 | 4:05:06 | NW DEVICE a | ALARM 1 | SEVERE | PATH R1 | PATH R2 |
| 4 | 2012/11/20 | 14:23:45 | NW DEVICE c | ALARM 3 | MODERATE | PATH R5 | PATH R3 |
| 5 | TO | TO | TO | TO | TO | TO | TO |
| 6 | TO | TO | TO | TO | TO | TO | TO |
| 7 | TO | TO | TO | TO | TO | TO | TO |

COMMUNICATION MONITOR, OCCURRENCE PREDICTION METHOD, AND RECORDING MEDIUM

CROSS-REFERENCE TO RELATED APPLICATION

This application is based upon and claims the benefit of priority of the prior Japanese Patent Application No. 2013-005771, filed on Jan. 16, 2013, the entire contents of which are incorporated herein by reference.

FIELD

The embodiment discussed herein is directed to a communication monitor, an occurrence prediction method, and a recording medium.

BACKGROUND

In a network operation management system, a communication monitor that predicts an alarm occurring in a network has been known. The communication monitor records an occurrence time of an alarm, a type of an alarm, and the like which are detected by a network device in a network as a change history, and predicts an alarm that will occur next using the change history.

For example, it is assumed that the communication monitor has a record representing that the frequency of occurrence of a pattern A in which an alarm 2 occurs after an alarm 1 occurs is 5 times and that the frequency of occurrence of a pattern B in which an alarm 3 occurs after the alarm 1 occurs is 4 times as the change history. When the occurrence of the alarm 1 is detected, the communication monitor searches the change history for a pattern using the alarm 1, and then determines the pattern A which is high in the frequency of occurrence as a search result. As a result, when the pattern A is determined, the communication monitor predicts the alarm 2 as an alarm that will occur after the alarm 1 occurs. Then, the communication monitor notifies the user of prediction of the occurrence of the alarm 2.

The communication monitor predicts an alarm of a "congestion failure" occurring as a traffic volume dynamically varies as well. However, in the congestion failure, for example, there are cases in which as a path is switched immediately after a congestion failure 1 occurs, a traffic volume of a path used after switching varies, and so another congestion failure 2 occurs. In this case, switching to another path is performed after the congestion failure 2 occurs. Then, for example, the communication monitor keeps a record representing that the frequency of occurrence of the pattern A in which the congestion failure 2 occurs after the congestion failure 1 occurs is 5 times and the frequency of occurrence of the pattern B in which the congestion failure 3 occurs after the congestion failure 1 occurs is 4 times as the change history.

Then, when the congestion failure 1 occurs, the communication monitor predicts the occurrence of the congestion failure 2 according to the pattern A which is high in the frequency of occurrence based on the change history such as the frequency of occurrence.

Patent Document 1: Japanese Laid-open Patent Publication No. 2009-10438
Patent Document 2: Japanese Laid-open Patent Publication No. 2005-285040

Since a congestion failure is a failure that occurs according to a traffic volume of data flowing through a path in a network, for example, there are cases in which the congestion failure 2 does not occur in practical even when the congestion failure 1 occurs. However, for example, when the congestion failure 1 occurs, the communication monitor simply predicts an alarm of the occurrence of the congestion failure 2 based on the change history such as the frequency of occurrence in the same way.

SUMMARY

According to an aspect of an embodiment, a communication monitor includes a generating unit that generates path change information including a path change at the time of the path change in a network and an alarm at the time of the path change. The communication monitor includes a collecting unit that collects traffic information of each path in the network. The communication monitor includes a calculating unit that calculates a degree of coincidence of traffic information representing a degree by which traffic information at the time of the current path change coincides with previous traffic information in the path change information immediately before the path change. Further, the communication monitor includes a predicting unit that predicts an alarm of the path change information related to the previous traffic information as an alarm at the time of the current path change when the degree of coincidence of the traffic information exceeds a predetermined threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an explanatory diagram illustrating an example of a path configuration and a link configuration of an NW device in a network monitored by an occurrence predicting device;

FIG. 5 is an explanatory diagram illustrating an example of a link table;

FIG. 6 is an explanatory diagram illustrating an example of a path table;

FIG. 9 is an explanatory diagram illustrating an example of a traffic volume table;

FIG. 10 is an explanatory diagram illustrating an example of a packet loss amount table;

FIG. 11 is an explanatory diagram illustrating an example of a delay amount table;

FIG. 12 is an explanatory diagram illustrating an example of a coincidence range table;

FIG. 20A is an explanatory diagram illustrating the flow in which various kinds of tables are used in connection with the information collection process;

FIG. 20B is an explanatory diagram illustrating the flow in which various kinds of tables are used in connection with the information collection process;

FIG. 20C is an explanatory diagram illustrating the flow in which various kinds of tables are used in connection with the information collection process;

FIG. 23 is an explanatory diagram illustrating the flow in which various kinds of tables are used in connection with the evaluation process;

FIG. 24 is an explanatory diagram illustrating the flow in which various kinds of tables are used in connection with the evaluation process;

FIG. 26 is an explanatory diagram illustrating the flow in which various kinds of tables are used in connection with the data weighting process;

FIG. 28 is an explanatory diagram illustrating the flow in which various kinds of tables are used in connection with the occurrence prediction process; and FIG. 29 is an explanatory diagram illustrating an example of an alarm prediction list screen displayed on at a client device side.

DESCRIPTION OF EMBODIMENT

Preferred embodiment of the present invention will be explained with reference to accompanying drawings. The present embodiment is not intended to limit the disclosure technology.

Figure 1:
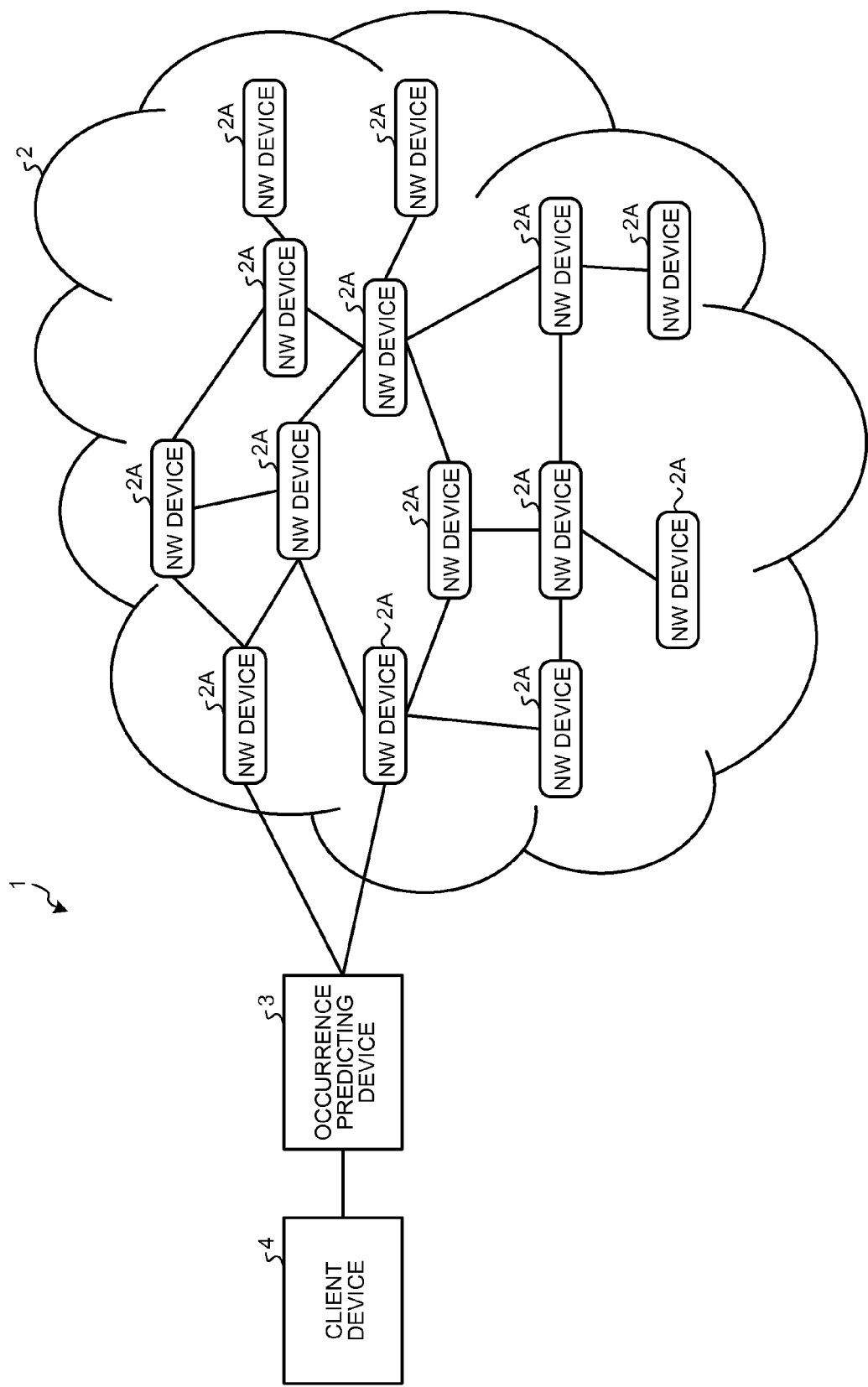
FIG. 1 is an explanatory diagram illustrating an exemplary operation management system according to the present embodiment.

FIG. 1 is an explanatory diagram illustrating an exemplary operation management system according to the present embodiment. An operation management system 1 includes a network 2 to which a plurality of network devices (hereinafter, referred to simply as "NW devices") 2A is connected, an occurrence predicting device 3, and a client device 4. The occurrence predicting device 3 monitors a communication state in the network 2, and predicts the occurrence of a failure, that is, an alarm based on the monitoring result. Further, the occurrence predicting device 3 registers and manages the occurrence of an alarm which is a prediction result, and provides alarm prediction, for example, according to a request from the client device 4.

Figure 2:
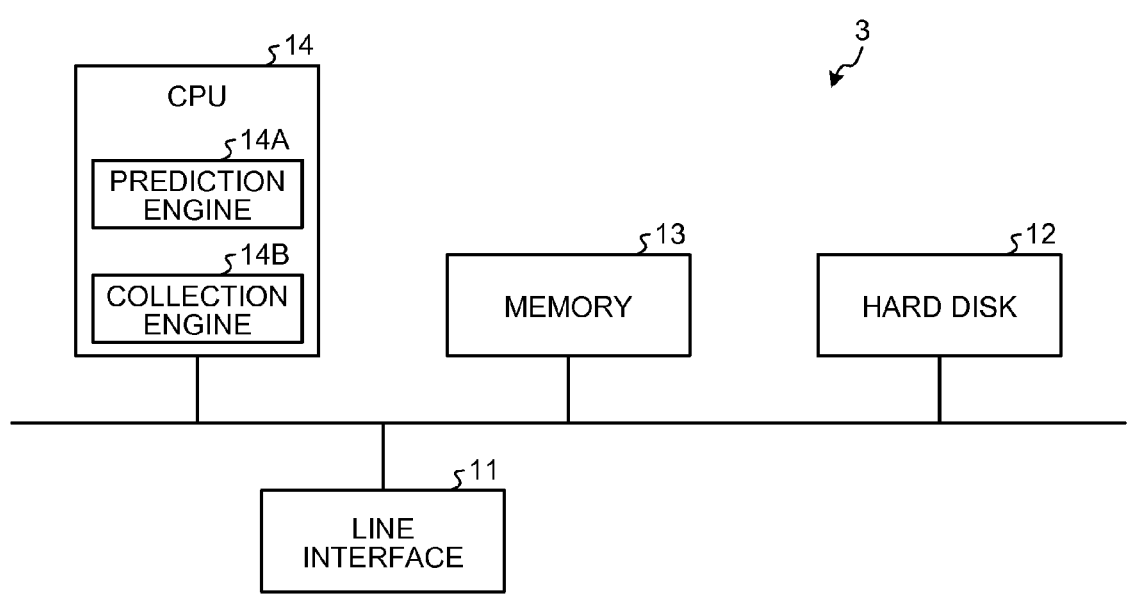
FIG. 2 is a block diagram illustrating an example of an occurrence predicting device.

FIG. 2 is a block diagram illustrating an example of the occurrence predicting device 3. The occurrence predicting device 3 includes a line interface 11, a hard disk 12, a memory 13, and a central processing unit (CPU) 14. The line interface 11 is an interface used to collect various kinds of information from the NW device 2A in the network 2 or the management device. The hard disk 12 is an area storing various kinds of information collected from the NW device 2A, various kinds of programs such as a prediction engine 14A and a collection engine 14B which will be described later, and information used for operations of the prediction engine 14A and the collection engine 14B. The memory 13 is an area storing various kinds of information.

The CPU 14 controls the occurrence predicting device 3 in general. The CPU 14 executes the prediction engine 14A and the collection engine 14B stored in the hard disk 12 as a process. The collection engine 14B is a program that collects information used to detect a path change from the NW device 2A or the management device, alarm information of an alarm being currently occurring, and traffic information through the line interface 11. The prediction engine 14A compares previous traffic information with current traffic information among pieces of traffic information collected by the collection engine 14B, and predicts an alarm based on a degree of coincidence.

Figure 3:
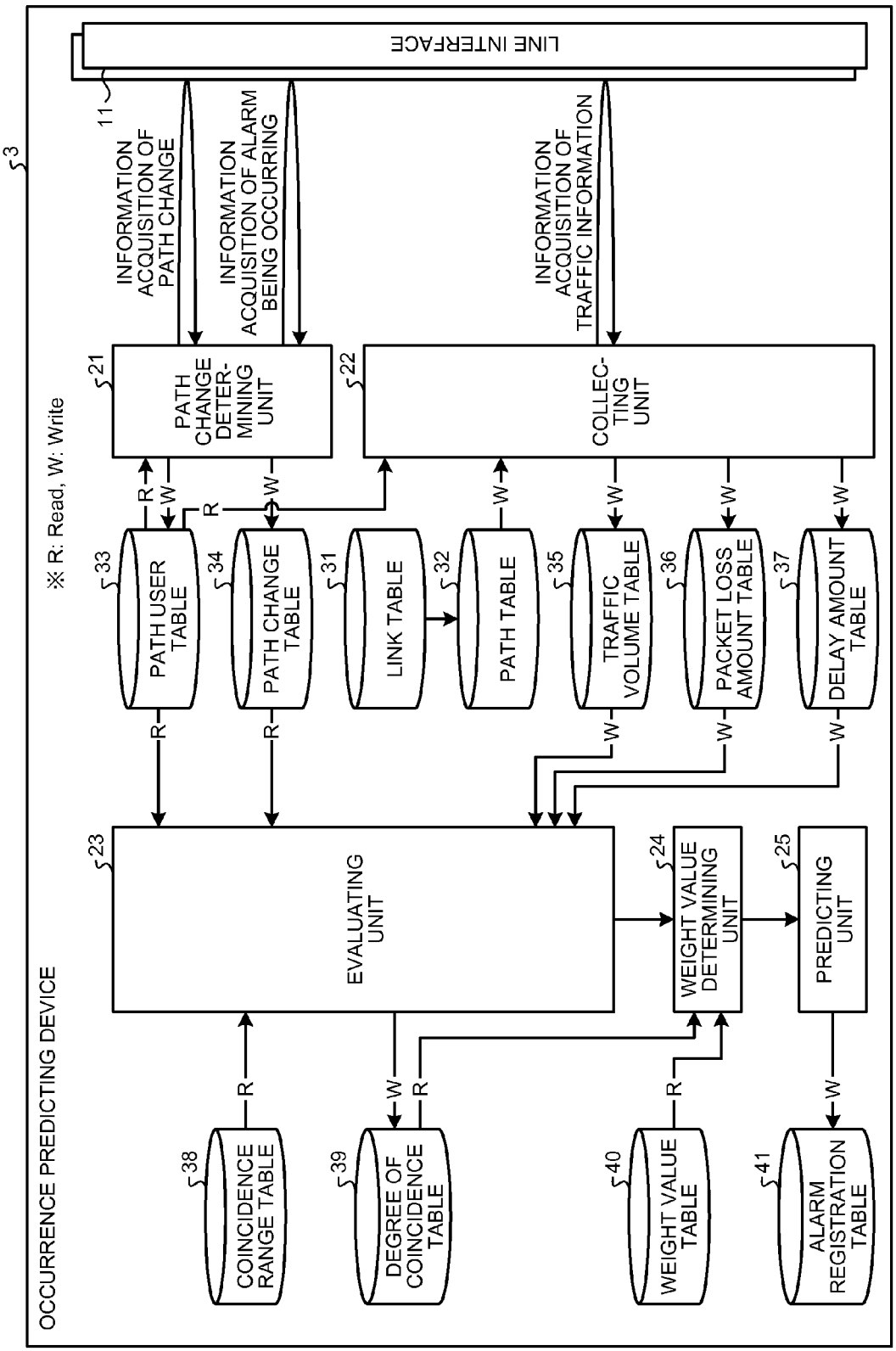
FIG. 3 is a functional block diagram illustrating an example of an occurrence predicting device.

FIG. 3 is a functional block diagram illustrating an example of the occurrence predicting device 3. The CPU 14 includes a path change determining unit 21, a collecting unit 22, an evaluating unit 23, a weight value determining unit 24, and a predicting unit 25. In other words, processing functions of the path change determining unit 21, the collecting unit 22, the evaluating unit 23, the weight value determining unit 24, and the predicting unit 25 are executed as a process. The memory 13 includes a link table 31, a path table 32, a path user table 33, a path change table 34, a traffic volume table 35, a packet loss amount table 36, and a delay amount table 37. The memory 13 further includes a coincidence range table 38, a degree of coincidence table 39, a weight value table 40, and an alarm registration table 41.

The path change determining unit 21 is, for example, a generating unit that collects information for detecting a path change in the network 2, collects a path being currently used and an alarm being occurring when a path change is detected, and stores the collected information in the path change table 34 as alarm path change information. Here, a method of detecting the path change through the path change determining unit 21 or a method of detecting an alarm being occurring can be appropriately changed, and for example, there are a method of collecting the information from the management device or the like that manages a path or an alarm and a method of collecting the information from the NW device 2A. The path change determining unit 21 may operate periodically or may operate on demand from the management device or the like.

The collecting unit 22 collects traffic information flowing through a link which is being used by each path in the network 2, and aggregates and stores traffic information of each path. Here, the traffic information refers to, for example, a traffic volume, a packet loss amount, and a delay amount of each path. The collecting unit 22 is a process of collecting a traffic volume, a packet loss amount, and a delay amount of each path at one-minute periods. The collecting unit 22 may use a method of collecting traffic information directly from the NW device 2A, a method of collecting traffic information from a probe device that captures traffic information of each path in the network 2, or the like. The collecting unit 22 may operate periodically or may operate on demand from the management device or the like.

The evaluating unit 23 acquires previous traffic information (a traffic volume, a packet loss amount, and delay information) immediately before an alarm occurs based on previous path change information, and compares the acquired previous traffic information with the current traffic information. Further, the evaluating unit 23 calculates a degree of coincidence representing how much the previous traffic information coincides with the current traffic information based on the comparison result. At this time, the evaluating unit 23 calculates a degree of coincidence of a traffic volume, a degree of coincidence of a packet loss amount, and a degree of coincidence of a delay amount among pieces of traffic information. The evaluating unit 23 stores the calculated degree of coincidence of the traffic volume, the calculated degree of coincidence of the packet loss amount, and the calculated degree of coincidence of the delay amount in a degree of coincidence table 39.

The weight value determining unit 24 weights a weight value according to a type of data to each degree of coincidence stored in the degree of coincidence table 39. Here, a type of data refers a traffic volume, a packet loss amount, a delay amount, or the like. The weight value determining unit 24 averages the degrees of coincidence to which a weight value is added according to a type of data, and calculates an average degree of coincidence.

The predicting unit 25 determines whether the average degree of coincidence calculated by the weight value determining unit 24 has exceeded an alarm threshold value. Here, the alarm threshold value refers to a threshold value used to determine an alarm of previous traffic information as an alarm to predict when current traffic information coincides with previous traffic information. When the average degree of coincidence has exceeded the alarm threshold value, the predicting unit 25 determines whether a tendency pattern of previous traffic information immediately before an alarm occurs coincides with a tendency pattern of current traffic information. The predicting unit 25 predicts that an alarm occurred in the previous traffic information will occur this time again, and registers alarm information including a name of the previous alarm and an alarm causing device in the alarm registration table 41 as a predictive alarm.

FIG. 4 is an explanatory diagram illustrating an example of a path configuration and a link configuration of the NW device 2A in the network 2 monitored by the occurrence predicting device 3. The network 2 illustrated in FIG. 4 is assumed to include, for example, the NW device 2A of "x," the NW device 2A of "a," the NW device 2A of "b," the NW device 2A of "c," the NW device 2A of "d," and the NW device 2A of "y" for the sake of convenience of description.

Further, for example, 5 paths R1 to R5 are assumed to be provided as paths R in the network 2. The path R1 is a path of the NW device 2A of "x"→the NW device 2A of "a"→the NW device 2A of "c"→the NW device 2A of "y." The path R2 is a path of the NW device 2A of "x"→the NW device 2A of "a"→the NW device 2A of "b"→the NW device 2A of "d"→the NW device 2A of "y." The path R3 is a path of the NW device 2A of "x"→the NW device 2A of "b"→the NW device 2A of "d"→the NW device 2A of "y." The path R4 is a path of the NW device 2A of "x"→the NW device 2A of "b"→the NW device 2A of "a"→the NW device 2A of "c"→the NW device 2A of "y." The path R5 is a path of the NW device 2A of "x"→the NW device 2A of "b"→the NW device 2A of "d"→the NW device 2A of "c"→the NW device 2A of "y."

Further, for example, 8 links L1 to L8 are assumed to be provided as links L in the path R. The link L1 is a link between a port "x1" of the NW device 2A of "x" and a port "a1" of the NW device 2A of "a." The link L2 is a link between a port "a2" of the NW device 2A of "a" and a port "c2" of the NW device 2A of "c." The link L3 is a link between a port "c1" of the NW device 2A of "c" and a port "y1" of the NW device 2A of "y." The link L4 is a link between a port "x2" of the NW device 2A of "x" and a port "b2" of the NW device 2A of "b." The link L5 is a link between a port "b1" of the NW device 2A of "b" and a port "d1" of the NW device 2A of "d." The link L6 is a link between a port "d2" of the NW device 2A of "d" and a port "y2" of the NW device 2A of "y." The link L7 is a link between a port "a3" of the NW device 2A of "a" and a port "b3" of the NW device 2A of "b." The link L8 is a link between a port "c3" of the NW device 2A of "c" and a port "d3" of the NW device 2A of "d." Further, a maximum traffic volume of each of the links L1 to L8 is assumed to be, for example, 100 bps.

FIG. 5 is an explanatory diagram illustrating an example of the link table 31. The link table 31 illustrated in FIG. 5 manages information related to the NW device 2A used by a link for each link. The link table 31 manages a link name 31A, a device name 31B, a port name 31C, a device name 31D, a port name 31E, and a maximum traffic volume 31F in association with one another for each link. The link name 31A is a link name identifying a link. The device name 31B is a device name identifying the NW device 2A to be used. The port name 31C is a port name identifying a port used by the NW device 2A. The device name 31D is a device name of the NW device 2A of the counterpart. The port name 31E is a port name of the NW device 2A of the counterpart. The maximum traffic volume is a maximum permissible amount of traffic flowing through a link. The content of the link table 31 is set in advance based on the network 2 illustrated in FIG. 4. The CPU 14 can identify that for example, in the case of the link L4, the NW device 2A of "x" uses the port "x2," the NW device 2A of "b" uses the port "b2," and the maximum traffic volume of the link L4 is 100 bps with reference to the link table 31.

FIG. 6 is an explanatory diagram illustrating an example of the path table 32. The path table 32 illustrated in FIG. 6 is a table in which use links 32B (L) of each path 32A (R) are listed. The link L used by the path R is represented by "1," and the link L not used by the path R is represented by a blank. Here, the content of the path table 32 is set in advance based on the network 2 illustrated in FIG. 4. The CPU 14 can identify that for example, in the path R1, when the links L1 to L3 are being used, the links L4 to L8 are not used with reference to the path table 32.

Figure 7:
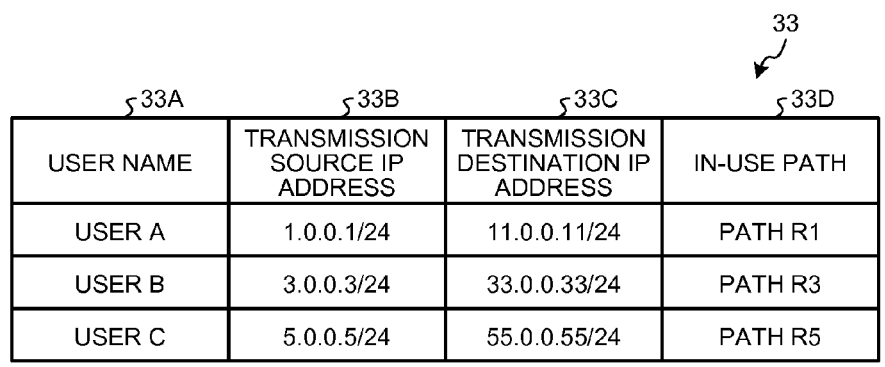
FIG. 7 is an explanatory diagram illustrating an example of a path user table.

FIG. 7 is an explanatory diagram illustrating an example of the path user table 33. The path user table 33 illustrated in FIG. 7 manages a user name 33A identifying the user, a transmission source IP address 33B, a transmission destination IP address 33C, and an in-use path 33D in association with one another. Here, the content of the path user table 33 is set in advance. For example, in the case of the "user A," the CPU 14 can identify the fact that the in-use path 33D is "R1" as well as the transmission source IP address and the transmission destination IP address with reference to the path user table 33.

Figure 8:
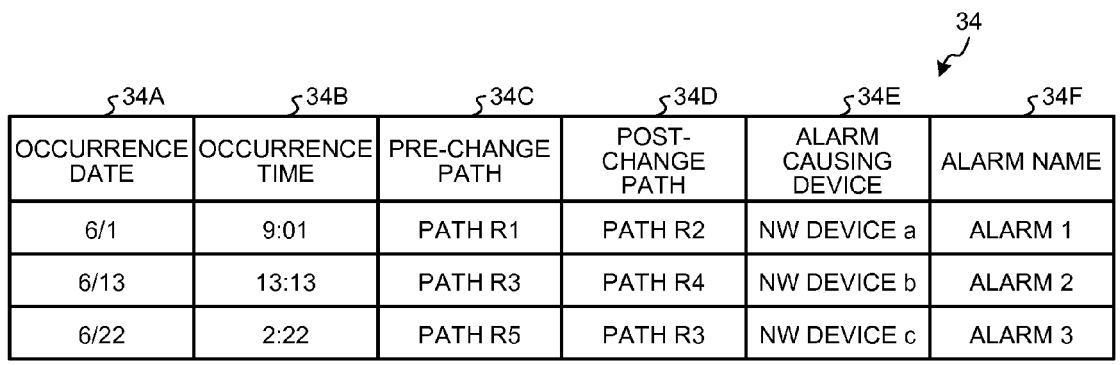
FIG. 8 is an explanatory diagram illustrating an example of a path change table.

FIG. 8 is an explanatory diagram illustrating an example of the path change table 34. The path change table 34 illustrated in FIG. 8 manages an occurrence date 34A, an occurrence time 34B, a pre-change path 34C, a post-change path 34D, an alarm causing device 34E, and an alarm name 34F in association with one another as history information when the path change has occurred. The occurrence date 34A and the occurrence time 34B are a date and a time of the occurrence of the path change. The pre-change path 34C is a path before the path change has occurred. The post-change path 34D is a path after the path change has occurred. The alarm causing device 34E is a device name identifying the NW device 2A for which an alarm is occurring. The alarm name 34F is an alarm name identifying an occurred alarm. The CPU 14 can identify that the path change from the path R3 to the path R4 has occurred at 13:13, June 13$^{th}$, and "the alarm 2" has been occurred in the NW device 2A of "b" which is the alarm causing device with reference to the path change table 34 of FIG. 8.

FIG. 9 is an explanatory diagram illustrating an example of the traffic volume table 35. The traffic volume table 35 illustrated in FIG. 9 manages a path name 35A, a month and date 35B, a time 35C, and a traffic volume 35D of each link for each path in association with each other. The path name 35A is an identifier identifying a path. The month and date 35B represents a collection month and date. The time 35C represents a collection time. The traffic volume 35D represents a traffic volume of each link in a path. The CPU 14 can identify that traffic of a traffic volume of 86 bps has flowed through each of the links L1 to L3 of the path "R1" at 12:38, August 15$^{th}$ with reference to the traffic volume table 35. Here, for the sake of convenience of description, the traffic volume table 35 is assumed to aggregate traffic volumes of respective links in a path at periods of 60 seconds. In this case, the collecting unit 22 is assumed to collect a traffic volume, for example, at periods of 60 seconds. Here, a collection period at which the collecting unit 22 collects a traffic volume can be appropriately set and changed.

FIG. 10 is an explanatory diagram illustrating an example of the packet loss amount table 36. The packet loss amount table 36 illustrated in FIG. 10 manages a path name 36A, a month and date 36B, a time 36C, and a packet loss amount 36D of each link for each path in association with one another. The path name 36A is an identifier identifying a path. The month and date 36B represents a collection month and date. The time 36C represents a collection time. The packet loss amount 36D represents a packet loss amount of each link in a path. The CPU 14 can identify that 18 packets have been lost in each of the links L1 to L3 of the path "R1" during one minute from 12:38, August 15$^{th}$ with reference to the packet loss amount table 36. Here, for the sake of convenience of description, the packet loss amount table 36 is assumed to aggregate packet loss amounts of respective links in a path at periods of 60 seconds. In this case, the collecting unit 22 is assumed to collect a packet loss amount, for example, at periods of 60 seconds. Here, a collection period at which the collecting unit 22 collects a packet loss amount can be appropriately set and changed.

FIG. 11 is an explanatory diagram illustrating an example of the delay amount table 37. The delay amount table 37 illustrated in FIG. 11 manages a path name 37A, a month and date 37B, a time 37C, and a delay amount 37D of each link for each path in association with one another. The path name 37A is an identifier identifying a path. The month and date 37B represents a collection month and date. The time 37C represents a collection time. The delay amount 37D represents a delay amount of each link in a path. The CPU 14 can identify that a delay has occurred by a delay amount of 15 packets in each of the links L1 to L3 of the path "R1" during one minute from 12:38, August 15$^{th}$ with reference to the delay amount table 37. Here, for the sake of convenience of description, the delay amount table 37 is assumed to aggregate delay amounts of respective links in a path at periods of 60 seconds. In this case, the collecting unit 22 is assumed to collect a delay amount, for example, at periods of 60 seconds. Here, a collection period at which the collecting unit 22 collects a delay amount can be appropriately set and changed.

FIG. 12 is an explanatory diagram illustrating an example of the coincidence range table 38. The coincidence range table 38 illustrated in FIG. 12 stores a data type 38A, a coincidence range 38B, and a determination result 38C in advance in association with one another. The data type 38A represents a data type of traffic information such as a traffic volume, a packet loss amount, and a delay amount. The coincidence range 38B is a permissible range within which the current traffic information is determined as coinciding with the previous traffic information. The CPU 14 determines that the current traffic volume coincides with the previous traffic volume when the current traffic volume is ±10% of the previous traffic volume with reference to the coincidence range table 38 because the coincidence range 38B of the traffic volume is "within ±10%." Further, the CPU 14 determines that the current packet loss amount coincides with the previous packet loss amount when the coincidence range 38B of the packet loss amount is "±30%" with reference to the coincidence range table 38. Further, the CPU 14 determines that the current delay amount coincides with the previous delay amount when the coincidence range 38B of the delay amount is "±30%" with reference to the coincidence range table 38.

Figure 13:
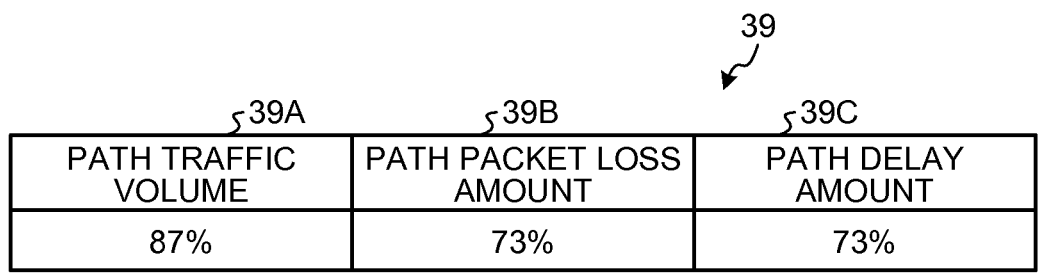
FIG. 13 is an explanatory diagram illustrating an example of a degree of coincidence table.

FIG. 13 is an explanatory diagram illustrating an example of the degree of coincidence table 39. The degree of coincidence table 39 illustrated in FIG. 13 stores a path traffic volume 39A, a path packet loss amount 39B, and a path delay amount 39C in association with one another. The path traffic volume 39A represents a degree of coincidence of a traffic volume representing how much the current traffic volume coincides with the previous traffic volume. The path packet loss amount 39B represents a degree of coincidence of a packet loss amount representing how much the current packet loss amount coincides with the previous packet loss amount. The path delay amount 39C represents a degree of coincidence of a delay amount representing how much the current delay amount coincides with the previous delay amount.

Figure 14:
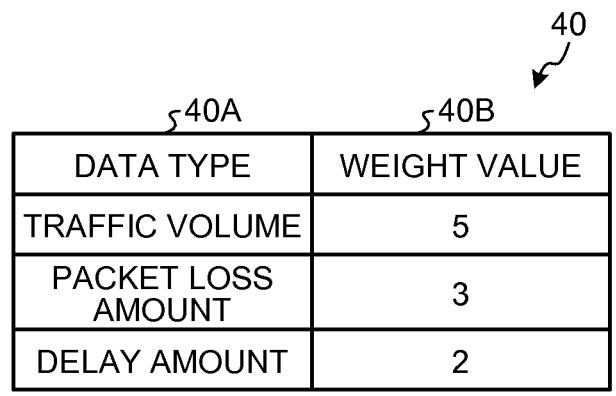
FIG. 14 is an explanatory diagram illustrating an example of a weight value table.

FIG. 14 is an explanatory diagram illustrating an example of the weight value table 40. The weight value table 40 illustrated in FIG. 14 stores a data type 40A and a weight value 40B in advance in association with each other. The weight value 40B is a weight value which is weighted to a degree of coincidence of each data type. For example, when the data type 40A is the traffic volume, the weight value 40B is "5." When the data type 40A is the packet loss amount, the weight value 40B is "3." When the data type 40A is the delay amount, the weight value 40B is "2." As a value of the weight value 40B increases, weighting increases as well.

Figure 15:
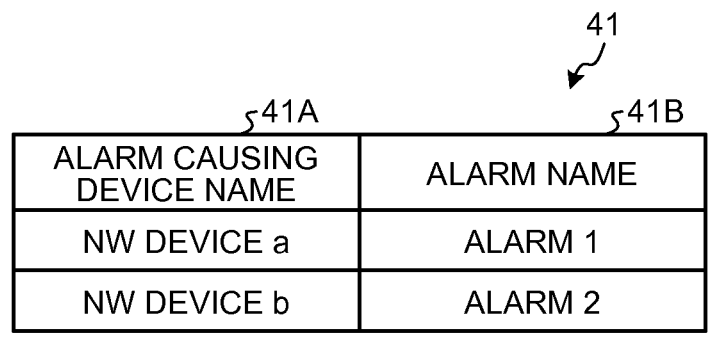
FIG. 15 is an explanatory diagram illustrating an example of an alarm registration table.

FIG. 15 is an explanatory diagram illustrating an example of the alarm registration table 41. The alarm registration table 41 illustrated in FIG. 15 stores an alarm causing device name 41A and an alarm name 41B in association with each other. The alarm causing device name 41A represents a device name identifying the NW device 2A causing an alarm. The alarm name 41B represents an alarm name identifying an occurred alarm. The CPU 14 can identify the alarm causing device name 41A as the NW device 2A causing an alarm and the alarm name 41B of the occurred alarm with reference to the alarm registration table 41.

Figure 16:
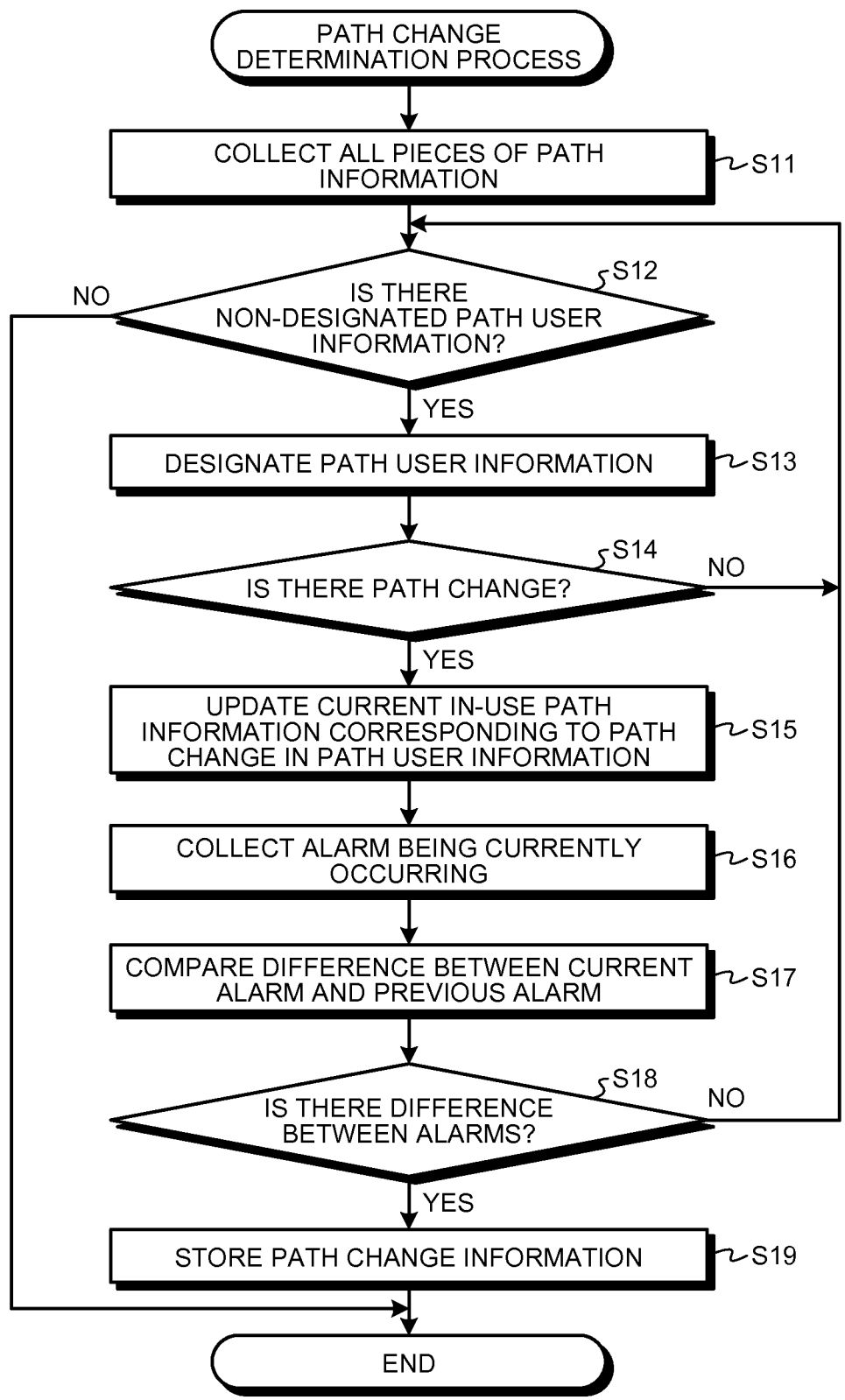
FIG. 16 is a flowchart illustrating an example of a processing operation of a CPU related to a path change determination process.
Figure 17:
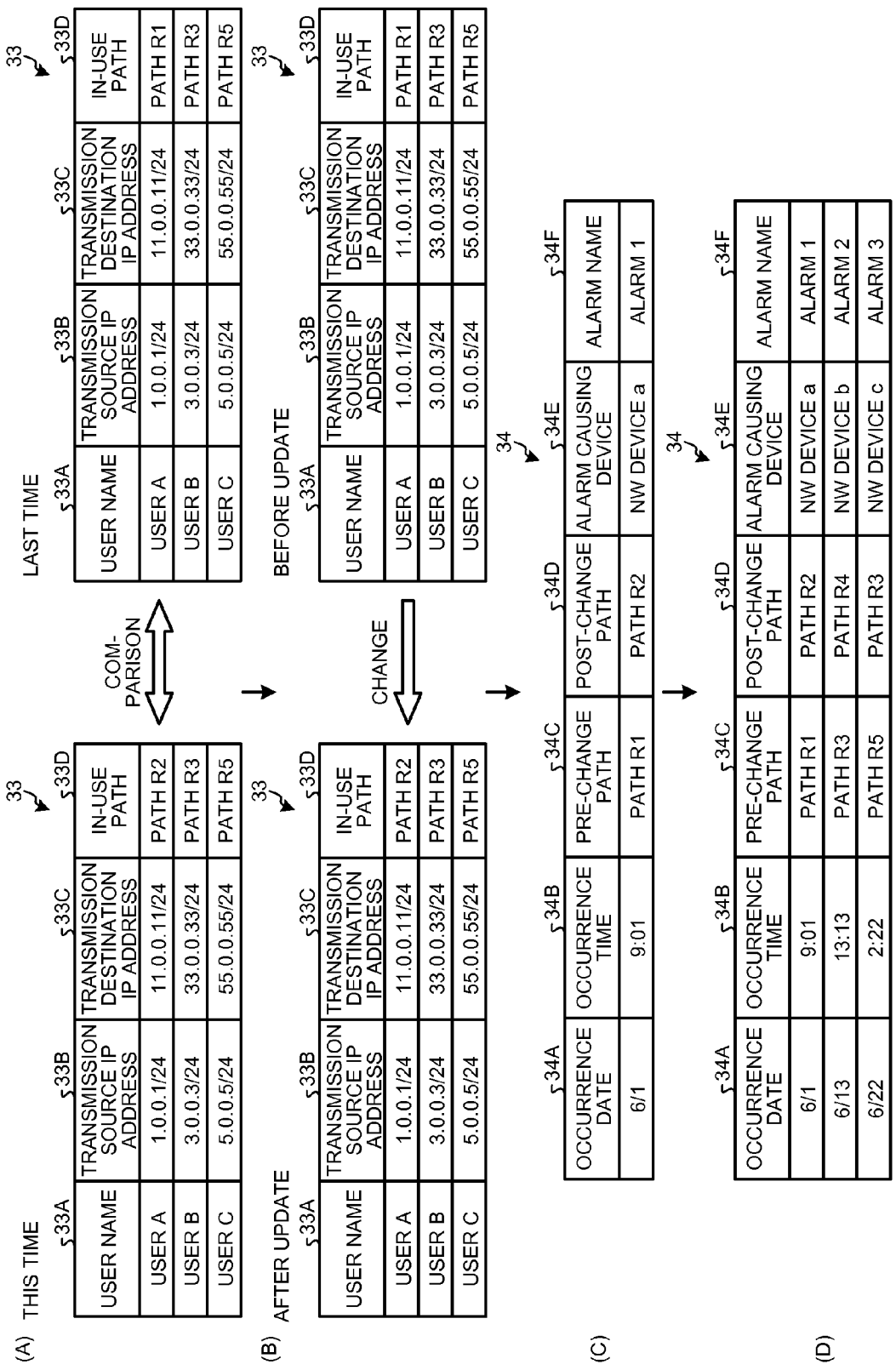
FIG. 17 is an explanatory diagram illustrating the flow in which various kinds of tables are used in connection with the path change determination process.

Next, an operation of the occurrence predicting device 3 according to the present embodiment will be described. First of all, a processing operation of a path change determination process performed by the occurrence predicting device 3 will be described with reference to FIGS. 16 and 17. FIG. 16 is a flowchart illustrating an example of a processing operation of the CPU 14 related to the path change determination process, and FIG. 17 is an explanatory diagram illustrating the flow in which various kinds of tables are used in connection with the path change determination process. The path change determination process illustrated in FIG. 16 is a process of the path change determining unit 21 that generates path change information based on a path change in the network 2 and an alarm difference. Here, the path change determining unit 21 may operate periodically or may operate in an on-demand manner.

Referring to FIG. 16, the path change determining unit 21 of the CPU 14 collects all pieces of path information in the network 2, for example, from the NW devices 2A and the management device (step S11). The path change determining unit 21 determines whether there is non-designated path user information (step S12). When it is determined that there is non-designated path user information (Yes in step S12), the path change determining unit 21 designates the path user information (step S13). The path change determining unit 21 determines whether there is a path change based on a change between a preceding in-use paths 33D and a subsequent in-use paths 33D in the path user table 33 as illustrated in (A) of FIG. 17 (step S14). Here, the path change determining unit 21 determines that the path change from the in-use path "R1" to the in-use path "R2" has occurred with reference to the user "A" of (A) of FIG. 17.

As a method of collecting a path change, for example, a path change may be collected from the management device that detects all path changes. As another method, information from which a path is understood such as routing information is collected directly from each NW device 2A, a current in-use path is compared with a previous in-use path based on a transmission source IP address and a transmission destination IP address, and a path change is collected based on a comparison result. As another method, data flowing through each link of a probe device or the like is captured, a current in-use path is compared with a previous in-use path, and a path change is collected based on a comparison result.

When it is determined that there is a path change (Yes in step S14), the path change determining unit 21 updates the in-use path 33D corresponding to the path change in the path user table 33 as illustrated in (B) of FIG. 17 (step S15). The path change determining unit 21 collects an alarm being currently occurring (step S16). Here, as a method of collecting information of the alarm being currently occurring, for example, information may be collected from a management device that manages an alarm being currently occurring, or the alarm information may be collected directly from the NW device 2A. The path change determining unit 21 compares a difference between a current alarm and a previous alarm (step S17).

The path change determining unit 21 determines whether there is an alarm difference based on a comparison result (step S18). When it is determined that there is an alarm difference (Yes in step S18), the path change determining unit 21 generates path change information and stores the path change information in the path change table 34 as illustrated in (C) of FIG. 17 (step S19), and then the processing operation illustrated in FIG. 16 ends. Here, when there are a plurality of pieces of path change information, the plurality of pieces of path change information are stored in the path change table 34 as illustrated in (D) of FIG. 17.

Meanwhile, when it is determined that there is no non-designated path user information (No in step S12), the path change determining unit 21 ends the processing operation illustrated in FIG. 16. Further, when it is determined that there is no path change (No in step S14), the path change determining unit 21 causes the process to proceed to step S12 in order to determine whether there is non-designated path user information. Further, when it is determined that there is no difference between the alarms (No in step S18), the path change determining unit 21 causes the process to proceed to step S12 in order to determine whether there is non-designated path user information. In other words, when it is determined that there is no difference between the alarms, the path change determining unit 21 does not store the path change information in the path change table 34.

In the path change determination process illustrated in FIG. 16, when a path change is detected and there is an alarm being currently occurring, path change information is generated based on the path change and the alarm, and then the path change information is stored in the path change table 34. As a result, the CPU 14 can identify an alarm occurrence date and time, an alarm causing device, an alarm name, a pre-change path, and a post-change path based on the path change information.

Figure 18:
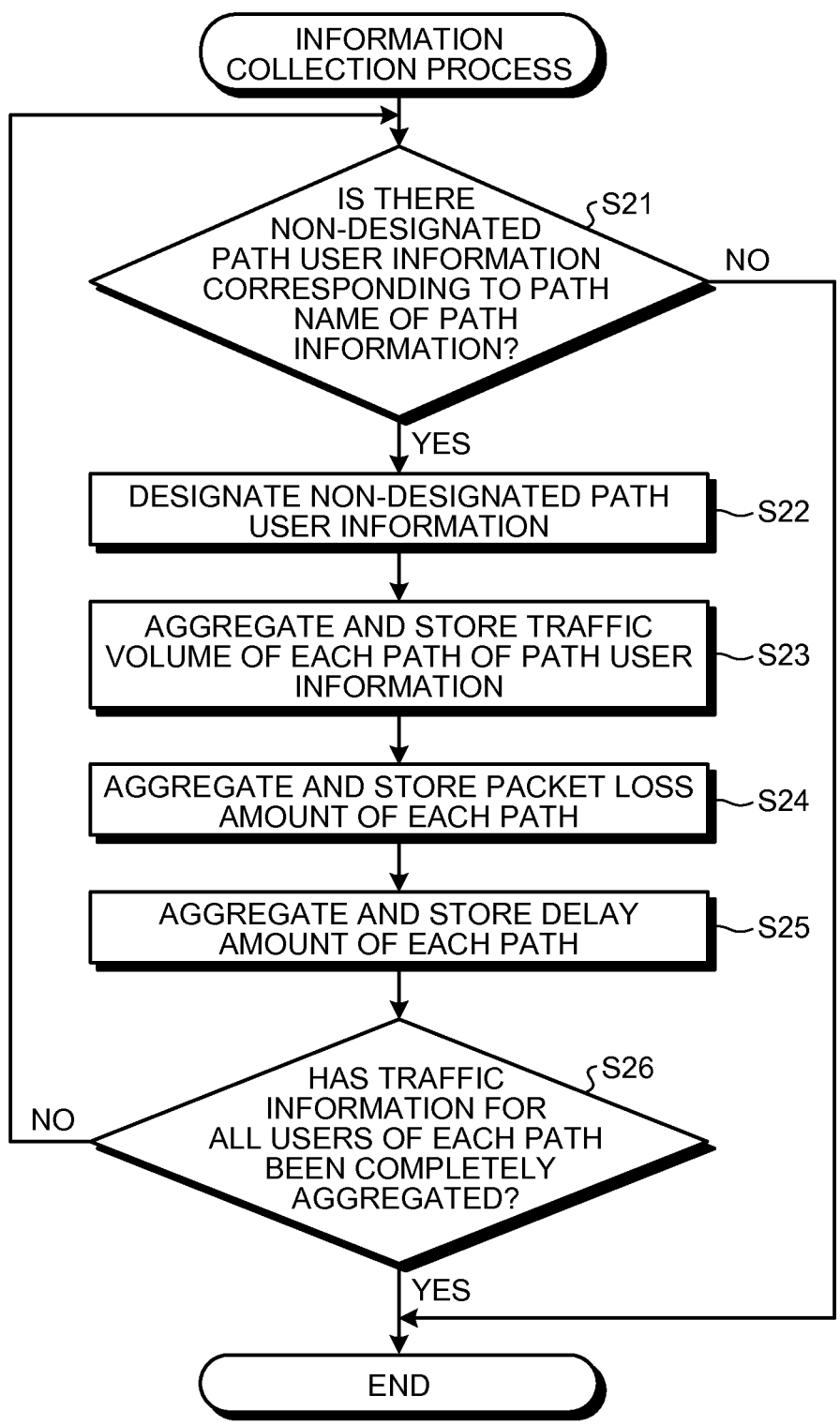
FIG. 18 is a flowchart illustrating an example of a processing operation of a CPU related to an information collection process.
Figure 19:
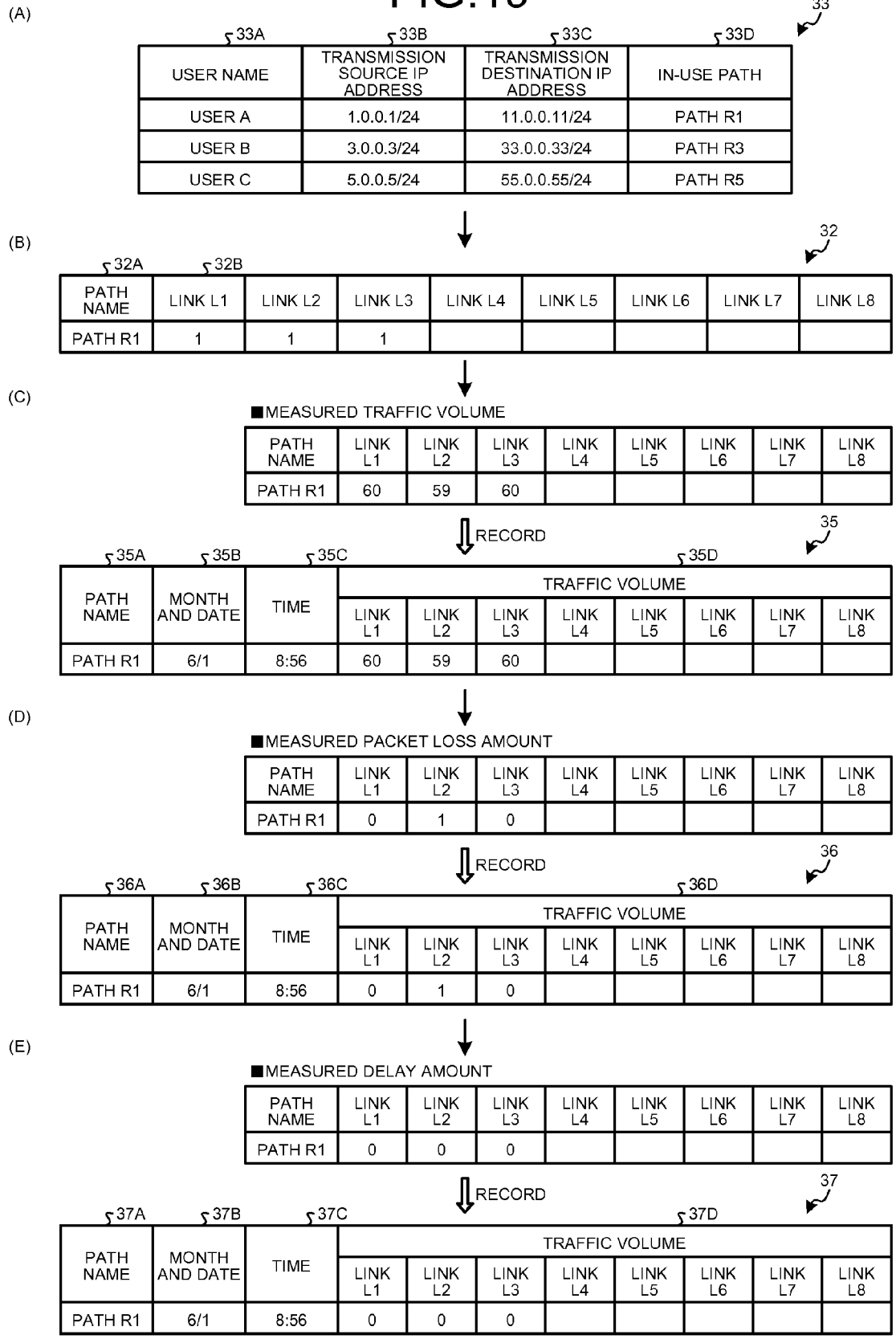
FIG. 19 is an explanatory diagram illustrating the flow in which various kinds of tables are used in connection with the information collection process.

Next, a processing operation of an information collection process will be described with reference to FIGS. 18 and 19 and FIGS. 20A to 20C. FIG. 18 is a flowchart illustrating an example of a processing operation of the CPU 14 related to the information collection process, and FIG. 19 is an explanatory diagram illustrating the flow in which various kinds of tables are used in connection with the information collection process. The information collection process illustrated in FIG. 18 is a process of the collecting unit 22 that collects a traffic volume, a packet loss amount, and a delay amount of each path and obtains aggregate information thereof.

Referring to FIG. 18, the collecting unit 22 of the CPU 14 determines whether there is non-designated path user information corresponding to a path name in the path information with reference to the path user table 33 illustrated in (A) of FIG. 19 (step S21). For example, the collecting unit 22 searches for the path user information corresponding to the path name "R1" in the path information. When it is determined that there is non-designated path user information (Yes in step S21), the collecting unit 22 designates the non-designated path user information (step S22).

Here, as a method of collecting traffic information such as a traffic volume, a packet loss amount, and a delay amount, for example, there are a method of collecting traffic information from a management device that manages traffic information and a method of collecting traffic information of each path directly from each NW device 2A. Further, as a method of obtaining aggregate traffic information of respective paths of all users, there is a method of collecting all pieces of traffic information of each path through a management device such as a probe device in the network 2. Further, as another method, there is a method of aggregating traffic information of each path based on a transmission source IP address and a transmission destination IP address.

The collecting unit 22 identifies a link used by each path with reference to the path table 32 illustrated in (B) of FIG. 19. Then, the collecting unit 22 collects traffic volumes of each path of the designated path user information as illustrated in (C) of FIG. 19, and aggregates the collected traffic volumes of each link for each path (step S23). In the process of step S23, used traffic volumes for all users are aggregated in link units for each path as illustrated in FIG. 20A.

The collecting unit 22 collects packet loss amounts of each path of the path user information as illustrated in (D) of FIG. 19, and aggregates collected packet loss amounts of each link for each path (step S24). In the process of step S24, packet loss amounts for all users are aggregated in link units for each path as illustrated in FIG. 20B. The collecting unit 22 collects delay amounts of each path as illustrated in (E) of FIG. 19, and aggregates collected delay amounts of respective links of each path (step S25). In the process of step S25, delay amounts for all users are aggregated in link units for each path as illustrated in FIG. 20C.

The collecting unit 22 determines whether traffic information for all users of each path has been completely aggregated (step S26). When it is determined that traffic information for all users of each path has been completely aggregated (Yes in step S26), the collecting unit 22 ends the processing operation illustrated in FIG. 18. However, when it is determined that traffic information for all users of each path has not been completely aggregated (No in step S26), the collecting unit 22 causes the process to proceed to step S21 in order to determine whether there is non-designated path user information. When it is determined that there is no non-designated path user information (No in step S21), the collecting unit 22 ends the processing operation illustrated in FIG. 18.

The information collection process illustrated in FIG. 18 aggregates traffic volumes for all users, packet loss amounts for all users, and delay amounts for all users in link units for each path, and stores the information. As a result, the CPU 14 can identify a traffic volume of each link for each path with reference to the traffic volume table 35. Further, the CPU 14 can identify a packet loss amount of each link for each path with reference to the packet loss amount table 36. Further, the CPU 14 can identify a delay amount of each link for each path with reference to the delay amount table 37.

Figure 21:
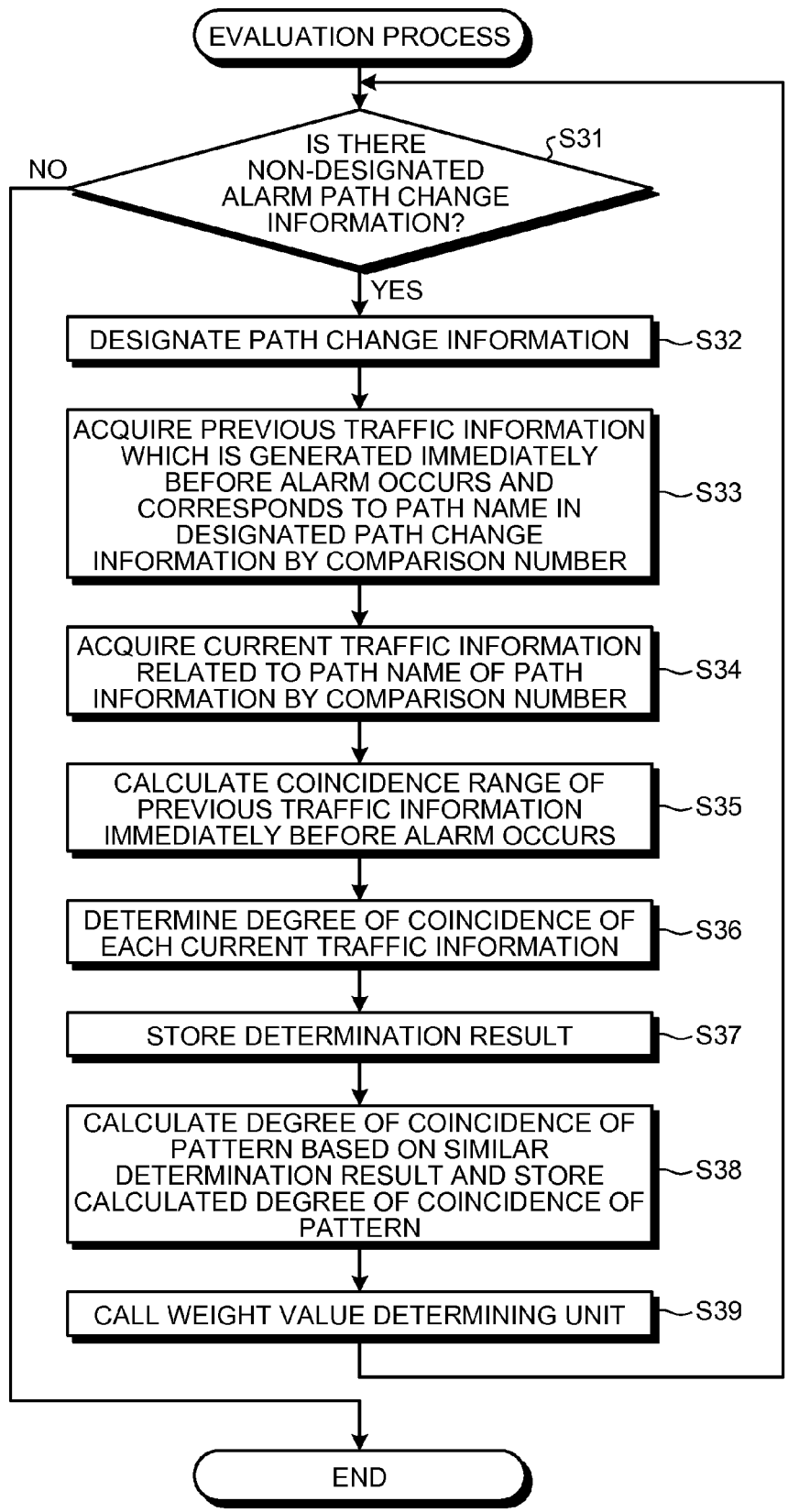
FIG. 21 is a flowchart illustrating an example of a processing operation of a CPU related to an evaluation process.
Figure 22:
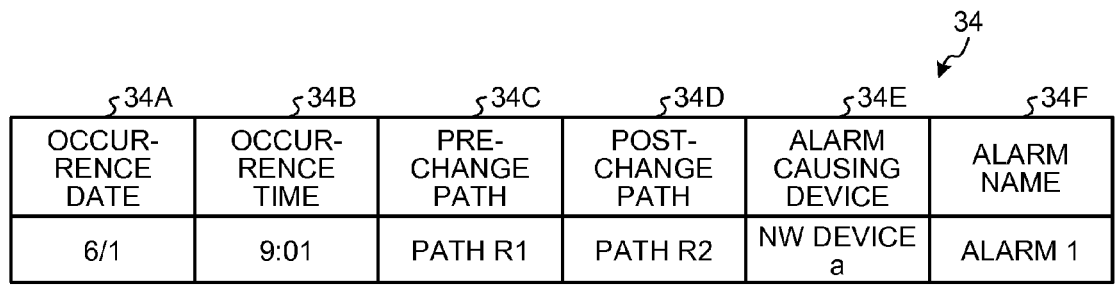
FIG. 22 is an explanatory diagram illustrating the flow in which various kinds of tables are used in connection with the evaluation process.

Next, a processing operation of an evaluation process will be described with reference to FIGS. 21 to 24. FIG. 21 is a flowchart illustrating an example of a processing operation of the CPU 14 related to the evaluation process, and FIGS. 22 to 24 are explanatory diagrams illustrating an example of the flow in which various kinds of tables are used in connection with the evaluation process. The evaluation process illustrated in FIG. 21 is a process of comparing previous traffic information immediately before an alarm occurs with current traffic information and then calculating a degree of coincidence representing how much the current traffic information coincides with the previous traffic information immediately before an alarm occurs based on the comparison result.

Referring to FIG. 21, the evaluating unit 23 of the CPU 14 determines whether there is non-designated previous path change information with reference to the path change table 34 illustrated in FIG. 22 (step S31). When it is determined that there is non-designated path change information (Yes in step S31), the evaluating unit 23 designates the non-designated previous path change information (step S32).

The evaluating unit 23 acquires the previous traffic information which is generated immediately before an alarm occurs and corresponds to the path name in the designated path change information by a comparison number (step S33). For example, the comparison number of the previous traffic information acquired by the evaluating unit 23 is set to 5 in advance. The comparison number can be appropriately set and changed. For example, when the path name in the designated path change information is "R1," the evaluating unit 23 acquires the previous traffic information which is immediately before an alarm occurs and corresponds to "R1." For the previous traffic information immediately before an alarm occurs, when traffic information for the alarm occurrence of the path change information is 09:01, June $1^{st}$, 5 pieces of traffic volumes are extracted from the traffic volume table 35 as traffic volumes immediately before an alarm occurs as illustrated in (A) of FIG. 23.

In other words, the evaluating unit 23 extracts previous traffic volumes corresponding to 9:00, 08:59, 08:58, 08:57, and 08:56, June $1^{st}$ as the previous traffic volume immediately before an alarm occurs. Further, the evaluating unit 23 extracts previous packet loss amounts corresponding to 9:00, 08:59, 08:58, 08:57, and 08:56, June $1^{st}$ as the packet loss amount immediately before an alarm occurs as illustrated in (B) of FIG. 23. Further, the evaluating unit 23 extracts previous delay amounts corresponding to 9:00, 08:59, 08:58, 08:57, and 08:56, June $1^{st}$ as the delay amount immediately before an alarm occurs as illustrated in (C) of FIG. 23. Here, for the sake of convenience of description, the evaluating unit 23 collectively manages a traffic volume 42D, a packet loss amount 42E, and a delay amount 42F as well as a path name 42A, a date 42B, and a time 42C as previous traffic information 42 immediately before an alarm occurs as illustrated in (D) of FIG. 23. Here, the traffic volume 42D is to manage previously used traffic volumes immediately before an alarm occurs in units of links L1 to L3. The packet loss amount 42E is to manage previous packet loss amount immediately an alarm occurs in units of links L1 to L3. The delay amount 42F is to manage previous delay amount immediately an alarm occurs in units of links L1 to L3.

When the previous traffic information 42 is acquired, the evaluating unit 23 acquires most recent current traffic information related to the path name of the path information by the comparison number (step S34). Here, the comparison number of the current traffic information acquired by the evaluating unit 23 is, for example, 5, the same as the previous traffic information. The evaluating unit 23 acquires 5 pieces of most recent traffic information 43 from the present as illustrated in (E) of FIG. 23. In the 5 pieces of traffic information 43, a path name 43A, a date 43B, a time 43C, a traffic volume 43D, a packet loss amount 43E, and a delay amount 43F are managed in association with one another. Here, the traffic volume 43D is to manage 5 most recently used traffic volumes in units of links L1 to L3. The packet loss amount 43E is to manage 5 most recent packet loss amounts in units of links L1 to L3. The delay amount 43F is to manage 5 most recent delay amounts in units of links L1 to L3.

The evaluating unit 23 calculates coincidence range information 44 illustrated in (B) of FIG. 24 from the previous traffic information 42 immediately before an alarm occurs illustrated in (A) of FIG. 24 with reference to the coincidence range table 38 of FIG. 12 (step S35). The evaluating unit 23 calculates the coincidence range information 44 from the traffic volume 42D, the packet loss amount 42E, and the delay amount 42F of each link unit in the previous traffic information 42 based on the coincidence range 38B of each data type 38A in the coincidence range table 38. In the coincidence range information 44, a traffic volume coincidence range 44D, a packet loss amount coincidence range 44E, and a delay amount coincidence range 44F as well as a path name 44A, a date 44B, and a time 44C are managed.

When the traffic volume 42D of the link L1 at 08:56, June $1^{st}$ illustrated in (A) of FIG. 24 is "60", the evaluating unit 23 calculates "54 to 66" as the traffic volume coincidence range 44D of the link L1 because the coincidence range 38B of the traffic volume is ±10%. Similarly, When the traffic volume 42D of the link L1 at 08:58, June $1^{st}$ is "80", the evaluating unit 23 calculates "72 to 88" as the traffic volume coincidence range 44D of the link L1 because the coincidence range 38B of the traffic volume is ±10%. The evaluating unit 23 calculates the coincidence range of the traffic volume of each link, and stores the calculated traffic volume coincidence range 44D in the coincidence range information 44.

Further, when the packet loss amount 42E of the link L1 at 08:58, June $1^{st}$ is "5" as illustrated in (A) of FIG. 24, the evaluating unit 23 calculates "3.5 to 6.5" as the packet loss amount coincidence range 44E of the link L1 because the coincidence range 38B of the packet loss amount is ±30%. Here, when the packet loss amount 42E is "0," the evaluating unit 23 calculates "0 to 1" as the packet loss amount coincidence range 44E regardless of ±30% of the coincidence range 38B. For example, when the packet loss amount 42E of the link L1 at 08:56, June $1^{st}$ is "0," the evaluating unit 23 calculates "0 to 1" as the packet loss amount coincidence range 44E of the link L1. The evaluating unit 23 calculates the coincidence range of the packet loss amount of each link, and stores the calculated packet loss amount coincidence range 44E in the coincidence range information 44.

Further, when the delay amount 42F of the link L1 at 08:58, June $1^{st}$ illustrated in (A) of FIG. 24 is "5", the evaluating unit 23 calculates "3.5 to 6.5" as the delay amount coincidence range 44F of the link L1 because the coincidence range 38B of "5" of the delay amount is ±30%. Here, when the delay amount 42F is "0," the evaluating unit 23 calculates "0 to 1" as the delay amount coincidence range 44F regardless of ±30% of the coincidence range 38B. For example, when the delay amount 42F of the link L1 at 08:56, June $1^{st}$ is "0," the evaluating unit 23 calculates "0 to 1" as the delay amount coincidence range 44F of the link L1. The evaluating unit 23 calculates the coincidence range of the delay amount of each link, and stores the calculated delay amount coincidence range 44F in the coincidence range information 44.

The evaluating unit 23 compares the current traffic information 43 illustrated in (C) of FIG. 24 with reference to the coincidence range information 44 of the previous traffic information, and performs a process of determining whether the current traffic information 43 coincides with the previous traffic information 42 (step S36). Here, the evaluating unit 23 determines whether the current traffic information 43 is within the coincidence range for each link of the traffic information in the coincidence range information 44. The evaluating unit 23 stores the determination result for each link of the current traffic information 43 in a determination result table 45 illustrated in (D) of FIG. 24 (step S37). Here, the determination result table 45 manages a path name 45A, a date 45B, a time 45C, a traffic volume determination result 45D, a packet loss amount determination result 45E, and a delay amount determination result 45F in association with one another.

The evaluating unit 23 calculates a degree of coincidence based on the current traffic information determination result, and stores the calculated degree of coincidence (step S38). Here, the evaluating unit 23 determines whether the current traffic information determination result is within the coincidence range, and sets the determination result of the corresponding link illustrated in (D) of FIG. 24 to "1" when the current traffic information 43 is within the coincidence range. Further, the evaluating unit 23 sets the determination result of the corresponding link illustrated in (D) of FIG. 24 to "0" when the current traffic information 43 is not within the coincidence range.

For example, the evaluating unit 23 determines whether "58" which is the current traffic volume 43D of the link L1 at 12:34, August $15^{th}$ as illustrated in (C) of FIG. 24 is within a range of "54 to 66" which is the traffic volume coincidence range 44D illustrated in (B) of FIG. 24. The evaluating unit 23 sets the traffic volume determination result 45D to "1" when the current traffic volume 43D of the link L1 is within the traffic volume coincidence range. Further, the evaluating unit 23 determines whether "71" which is the current traffic volume 43D of the link L1 at 12:36, August $15^{th}$ as illustrated in (C) of FIG. 24 is within a range of "72 to 88" which is the traffic volume coincidence range 44D illustrated in (B) of FIG. 24. The evaluating unit 23 sets the traffic volume determination result 45D to "0" when the current traffic volume 43D of the link L1 is not within the traffic volume coincidence range.

The evaluating unit 23 calculates the degree of coincidence of the traffic volume based on a proportion of "1" of the determination result with respect to a total of 15 in the case where the traffic volume determination results in the determination result table 45 are all "1". When the determination result of "1" is set as "13" with respect to a total of 15 in the case where the traffic volume determination results are all "1," the evaluating unit 23 calculates the degree of coincidence of the traffic volume as "87%" as illustrated in (A) of FIG. 26 because 13÷15×100=87%. Then, the evaluating unit 23 stores the degree of coincidence of the traffic volume in the degree of coincidence table 39.

Further, the evaluating unit 23 calculates the degree of coincidence of the packet loss amount based on a proportion of "1" of the determination result with respect to a total of 15 in the case where the packet loss amount determination results in the determination result table 45 are all "1". When the determination result of "1" is set as "11" with respect to a total of 15 in the case where the packet loss amount determination results are all "1," the evaluating unit 23 calculates the degree of coincidence of the packet loss amount as "73%" as illustrated in (A) of FIG. 26 because 11÷15×100=73%. Then, the evaluating unit 23 stores the degree of coincidence of the packet loss amount in the degree of coincidence table 39.

Further, the evaluating unit 23 calculates the degree of coincidence of the delay amount based on a proportion of "1" of the determination result with respect to a total of 15 in the case where the delay amount determination results in the determination result table 45 are all "1". When the determination result of "1" is set as "11" with respect to a total of 15 in the case where the delay amount determination results are all "1," the evaluating unit 23 calculates the degree of coincidence of the delay amount as "73%" as illustrated in (A) of FIG. 26 because 11÷15×100=73%.

The evaluating unit 23 stores the degree of coincidence of the traffic volume, the degree of coincidence of the packet loss amount, and the degree of coincidence of the delay amount in the determination result table 45, then calls the weight value determining unit 24 (step S39), and ends the processing operation illustrated in FIG. 21. Meanwhile, when it is determined that there is no non-designated path change information (No in step S31), the evaluating unit 23 ends the processing operation illustrated in FIG. 21.

The evaluation process illustrated in FIG. 21 calculates the degree of coincidence of the traffic volume, the degree of coincidence of the packet loss amount, and the degree of coincidence of the delay amount based on the comparison result of the previous traffic information immediately before an alarm occurs and the current traffic information. As a result, the CPU 14 can acquire the degree of coincidence of the traffic volume, the degree of coincidence of the packet loss amount, and the degree of coincidence of the delay amount between the current traffic information and the previous traffic information immediately before an alarm occurs.

Figure 25:
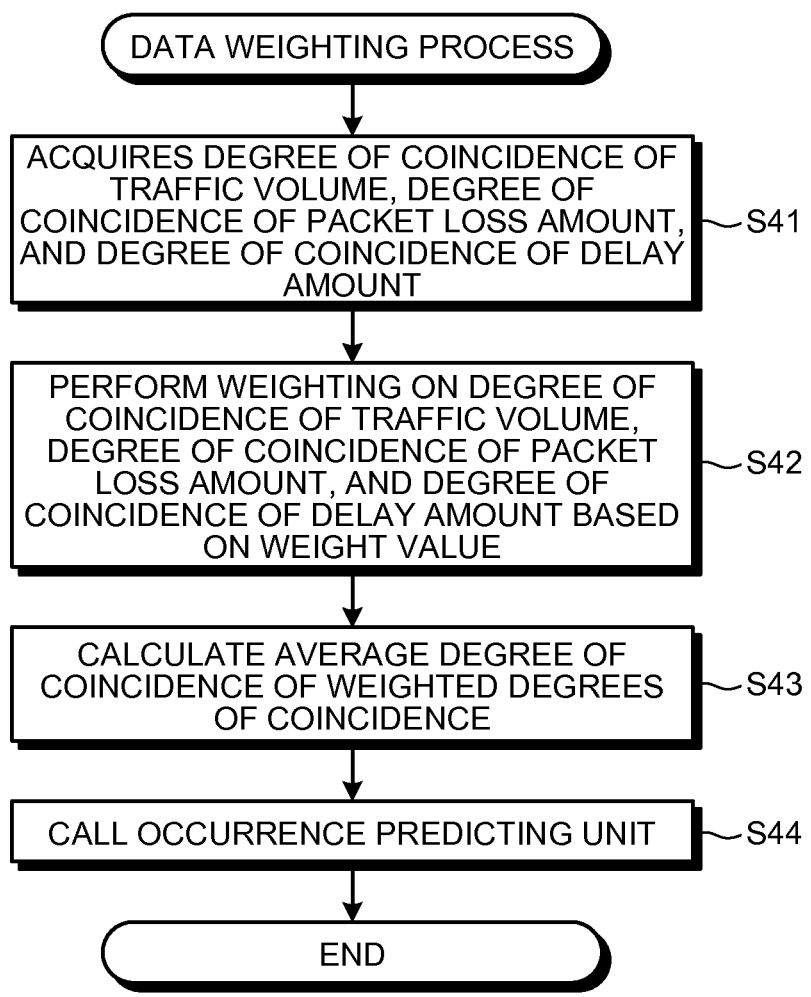
FIG. 25 is a flowchart illustrating an example of a processing operation of a CPU related to a data weighting process.

Next, a processing operation of a data weighting process will be described with reference to FIGS. 25 and 26. FIG. 25 is a flowchart illustrating an example of a processing operation of the CPU 14 related to the data weighting process, and FIG. 26 is an explanatory diagram illustrating an example of the flow in which various kinds of tables are used in connection with the data weighting process. The data weighting process illustrated in FIG. 25 is a process of the weight value determining unit 24 that performs weighting on each of the degree of coincidence of the traffic volume, the degree of coincidence of the packet loss amount, and the degree of coincidence of the delay amount using weight values of respective data types, and calculates an average degree of coincidence of each of the degree of coincidence of the traffic volume, the degree of coincidence of the packet loss amount, and the degree of coincidence of the delay amount on which weighting is performed.

Referring to FIG. 25, the weight value determining unit 24 of the CPU 14 acquires the degree of coincidence 39A of the traffic volume, the degree of coincidence 39B of the packet loss amount, and the degree of coincidence 39C of the delay amount with reference to the degree of coincidence table 39 illustrated in (A) of FIG. 26 (step S41). The weight value determining unit 24 performs weighting on each of the degree of coincidence of the traffic volume, the degree of coincidence of the packet loss amount, and the degree of coincidence of the delay amount based on the weight value 40B of the weight value table 40 illustrated in (B) of FIG. 26 (step S42). Here, when the weight value of the traffic volume is "5," the weight value determining unit 24 performs weighting on the degree of coincidence of the traffic volume as in "degree of coincidence of traffic volume×weight value÷sum of weight values," that is, 87%×5/10=43.5% as illustrated in (C) of FIG. 26. Further, when the weight value of the packet loss amount is "3," the weight value determining unit 24 performs weighting on the degree of coincidence of the packet loss amount as in "degree of coincidence of traffic volume×weight value÷sum of weight values," that is, 73%×3/10=21.9%. Further, when the weight value of the delay amount is "2," the weight value determining unit 24 performs weighting on the degree of coincidence of the delay amount as in "degree of coincidence of traffic volume×weight value÷sum of weight values," that is, 73%×2/10=14.6%.

The weight value determining unit 24 calculates the average degree of coincidence by adding the weighting result of the degree of coincidence of the traffic volume, the weighting result of the degree of coincidence of the packet loss amount, and the weighting result of the degree of coincidence of the delay amount (step S43). Here, the average degree of coincidence calculated by the weight value determining unit 24 is 80% (=43.5%+21.9%+14.6%). After calculating the average degree of coincidence, the weight value determining unit 24 calls the predicting unit 25 (step S44), and then ends the processing operation illustrated in FIG. 25.

In the data weighting process illustrated in FIG. 25, weighting is performed on the degree of coincidence of the traffic volume, the degree of coincidence of the packet loss amount, and the degree of coincidence of the delay amount using the weight values 40B of the respective data types, and the average degree of coincidence in which the weight values of the respective data types are reflected is calculated. As a result, the CPU 14 can calculate the average degree of coincidence in which the weight values of the respective data types are reflected.

Figure 27:
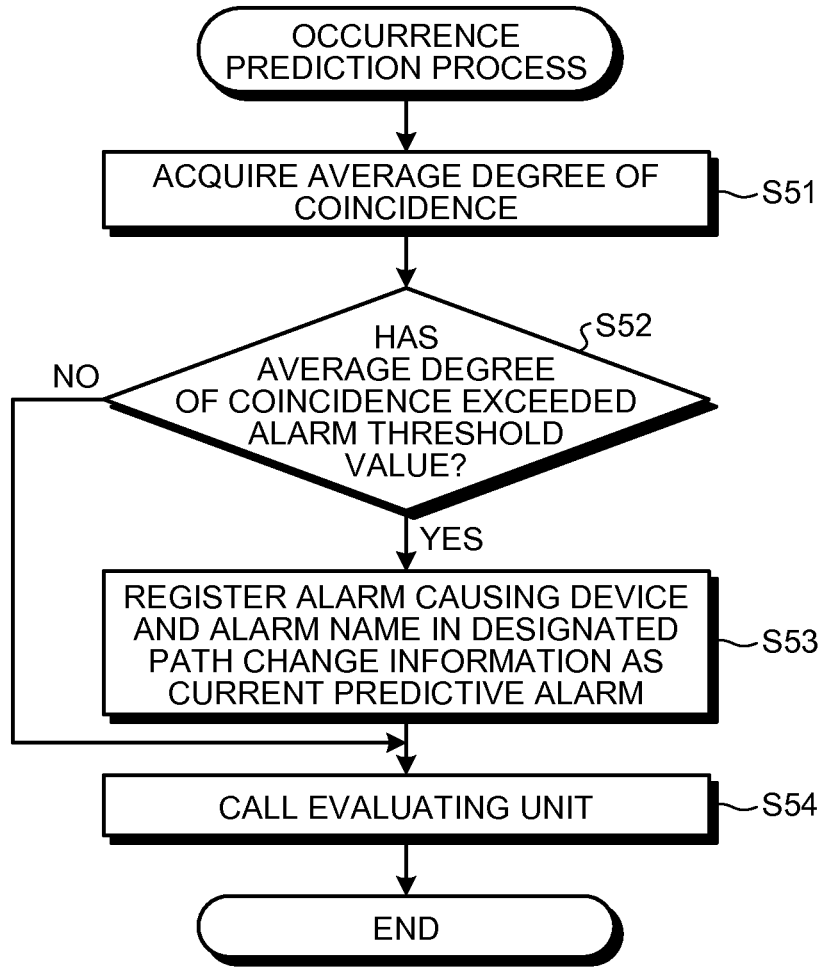
FIG. 27 is a flowchart illustrating an example of a processing operation of a CPU related to an occurrence prediction process.

Next, a processing operation of the occurrence prediction process will be described with reference to FIGS. 27 and 28. FIG. 27 is a flowchart illustrating an example of a processing operation of the CPU 14 related to the occurrence prediction process, and FIG. 28 is an explanatory diagram illustrating an example of the flow in which various kinds of tables are used in connection with the occurrence prediction process. The occurrence prediction process illustrated in FIG. 28 is a process of the predicting unit 25 that when the average degree of coincidence exceeds the alarm threshold value, determines whether the current traffic information coincides with the previous traffic information immediately before an alarm occurs, and predicts an occurred alarm of the previous traffic information as a current alarm.

Referring to FIG. 27, the predicting unit 25 of the CPU 14 acquires the average degree of coincidence (step S51). The predicting unit 25 determines whether the average degree of coincidence has exceeded the alarm threshold value (step S52). Here, the alarm threshold value is assumed to be set to, for example, 75% in advance.

When it is determined that the average degree of coincidence has exceeded the alarm threshold value (Yes in step S52), the predicting unit 25 refer to the path change table 34 illustrated in (A) of FIG. 28. Then, the predicting unit 25 registers the alarm causing device 34E and the alarm name 34F in the path change information designated in step S32 to the alarm registration table 41 as a current predictive alarm as illustrated in (B) of FIG. 28 (step S53).

Further, the predicting unit 25 calls the evaluating unit 23 in order to determine whether there is non-designated path change information (step S54), and ends the processing operation illustrated in FIG. 27. Here, the predicting unit 25 executes the evaluation process illustrated in FIG. 21 by calling the evaluating unit 23 in step S54. Meanwhile, when it is determined that the average degree of coincidence has not exceeded the alarm threshold value (No in step S52), the predicting unit 25 causes the process to proceed to step S54 in order to call the evaluating unit 23.

In the occurrence prediction process illustrated in FIG. 27, when the average degree of coincidence exceeds the alarm threshold value, the alarm name 41B and alarm causing device 41A in the previous path change information related to the average degree of coincidence are registered to the alarm registration table 41 as the current predictive alarm. As a result, the CPU 14 can predict the alarm name and the alarm causing device as an alarm to occur this time when the average degree of coincidence exceeds the alarm threshold value.

FIG. 29 is an explanatory diagram illustrating an example of an alarm prediction list screen displayed on at a client device side. The client device 4 accesses the occurrence predicting device 3, and displays a prediction list screen 80 of path change information related to an predictive alarm registered to the alarm registration table 41 in the occurrence predicting device 3. The prediction list screen 80 includes an identification number 80A, an alarm prediction date and time 80B, a failure spot 80C, a predictive alarm name 80D, a failure rank 80E, a pre-change path 80F, and a post-change path 80G. The identification number 80A is a number identifying a predictive alarm. The alarm prediction date and time 80B is a date and time at which a predictive alarm has been predicted. The failure spot 80C is a device name identifying the NW device 2A in which a failure has occurred. The predictive alarm name 80D is an alarm name predicted by the occurrence predicting device 3. The failure rank 80E is a rank identifying an importance level of an alarm. The pre-change path 80F is a path before a path change. The post-change path 80G is a path after a path change. As a result, the user of the client device 4 can access the occurrence predicting device 3 and view the prediction list screen 80.

In the present embodiment, when a average degree of coincidence in which current traffic information coincides with previous traffic information immediately before an alarm occurs exceeds the alarm threshold value, an alarm of path change information related to previous traffic information is predicted as a current alarm of current traffic information. As a result, the occurrence predicting device 3 considers a degree of coincidence between the current traffic information and previous traffic information, and thus the alarm occurrence prediction accuracy can be increased. Further, since the alarm occurrence prediction accuracy is increased, provision of an erroneously predicted alarm to the user is prevented. Further, since the alarm occurrence prediction accuracy is increased, the user can cope with only a predicted alarm in advance, and thus a useless work of coping with an erroneously predicted alarm as in the related art is reduced as well.

In the present embodiment, since traffic information includes a traffic volume of each path, a packet loss amount of each path, and a delay amount of each path, a degree of coincidence between current traffic information and previous traffic information is determined using the traffic volume, the packet loss amount, and the delay amount. As a result, the occurrence predicting device 3 increases the accuracy of the degree of coincidence of the current traffic information and the previous traffic information and thus improves the alarm occurrence prediction accuracy.

In the present embodiment, a weight value of each data type of traffic information is stored, and weighting can be performed on a degree of coincidence of each data type based on a weight value of each data type.

In the present embodiment, a degree of coincidence is calculated by comparing a comparison number of pieces of most recent current traffic information with a comparison number of pieces of previous traffic information immediately before an alarm occurs, and thus the accuracy for determining the degree of coincidence can be increased by increasing the comparison number.

In the above embodiment, when a degree of coincidence of traffic information is calculated, a traffic volume of each path, a packet loss amount of each path, and a delay amount of each path are used, but at least one of the traffic volume, the packet loss amount, and the delay amount may be used.

Each of the components illustrated in the drawings need not be physically configured as illustrated in the drawings. In other words, a concrete form of dispersion or integration of respective components is not limited to the illustrated examples, and all or some of the components may be configured to be dispersed or integrated functionally or physically in arbitrary units according to various kinds of loads or initialization states.

Further, all or some of various kinds of processing functions performed in respective devices may be executed on a central processing unit (CPU) (or a micro computer such as a micro processing unit (MPU) or a micro controller unit (MCU)). Further, all or some of various kinds of processing functions may be executed on a program that is analyzed and executed by a CPU (or a micro computer such as an MPU or a MCU) or hardware configured with a wired logic.

According to an embodiment of the disclosure, it is possible to increase alarm prediction accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication monitor comprising:
   a generating unit that generates path change information including a path change at the time of the path change in a network and an alarm at the time of the path change;
   a collecting unit that collects traffic information of each path in the network;
   a calculating unit that calculates a degree of coincidence of traffic information representing a degree by which traffic information at the time of a current path change coincides with previous traffic information in the path change information immediately before the path change; and
   a predicting unit that predicts an alarm of the path change information related to the previous traffic information as the alarm at the time of the current path change generated by the generating unit when the degree of coincidence of the traffic information exceeds a predetermined threshold value.

2. The communication monitor according to claim 1, wherein the traffic information includes at least one of a traffic volume of each path, a packet loss amount of each path, and a delay amount of each path.

3. The communication monitor according to claim 1, further comprising:
   a storage unit that stores a weight value weighted to the degree of coincidence for each data type of the traffic information; and
   a weighting unit that reads the weight value according to the data type of the traffic information from the storage unit, and performs weighting on the degree of coincidence of the traffic information based on the read weight value,
   wherein the predicting unit determines whether the degree of coincidence weighted by the weighting unit exceeds the predetermined threshold value.

4. The communication monitor according to claim 1, wherein the calculating unit calculates the degree of coincidence representing a degree by which a predetermined number of pieces of most recent current traffic information coincides with a predetermined number of pieces of consecutive previous traffic information immediately before the path change.

5. The communication monitor according to claim 1, wherein the collecting unit collects the traffic volume, the packet loss amount, and the delay amount of each path, and
   the calculating unit includes
   a first calculating unit that calculates a degree of coincidence of the traffic volume representing a degree by which a traffic volume at the time of the current path change coincides with a previous traffic volume in the path change information immediately before the path change;
   a second calculating unit that calculates a degree of coincidence of the packet loss amount representing a degree by which a packet loss amount at the time of the current path change coincides with a previous packet loss amount in the path change information immediately before the path change;
   a third calculating unit that calculates a degree of coincidence of the delay amount representing a degree by which a delay amount at the time of the current path change coincides with a previous delay amount in the path change information immediately before the path change; and
   a fourth calculating unit that averages the degree of coincidence of the traffic volume calculated by the first calculating unit, the degree of coincidence of the packet loss amount calculated by the second calculating unit, and the degree of coincidence of the delay amount calculated by the third calculating unit, and calculates the degree of coincidence of the traffic information based on the averaged degrees.

6. An occurrence prediction method of a communication monitor, the occurrence prediction method comprising:
generating path change information including a path change at the time of the path change in a network and an alarm at the time of the path change;
collecting traffic information of each path in the network;
calculating a degree of coincidence of traffic information representing a degree by which traffic information at the time of a current path change coincides with previous traffic information in the path change information immediately before the path change; and
predicting an alarm of the path change information related to the previous traffic information as the alarm at the time of the current path change generated by the generating unit when the degree of coincidence of the traffic information exceeds a predetermined threshold value.

7. A non-transitory computer-readable recording medium having stored therein an occurrence prediction program that causes a computer to execute a process comprising:
generating path change information including a path change at the time of the path change in a network and an alarm at the time of the path change;
collecting traffic information of each path in the network;
calculating a degree of coincidence of traffic information representing a degree by which traffic information at the time of a current path change coincides with previous traffic information in the path change information immediately before the path change; and
predicting an alarm of the path change information related to the previous traffic information as the alarm at the time of the current path change generated by the generating unit when the degree of coincidence of the traffic information exceeds a predetermined threshold value.

* * * * *